(12) United States Patent
Raveendran et al.

(10) Patent No.: US 9,503,771 B2
(45) Date of Patent: Nov. 22, 2016

(54) LOW LATENCY WIRELESS DISPLAY FOR GRAPHICS

(75) Inventors: Vijayalakshmi R. Raveendran, San Diego, CA (US); Fawad Shaukat, San Diego, CA (US); Xiaodong Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/364,801

(22) Filed: Feb. 2, 2012

(65) Prior Publication Data
US 2013/0047189 A1    Feb. 21, 2013

Related U.S. Application Data

(60) Provisional application No. 61/439,690, filed on Feb. 4, 2011, provisional application No. 61/584,021, filed on Jan. 6, 2012.

(51) Int. Cl.
| | | |
|---|---|---|
| H04N 7/18 | (2006.01) | |
| H04N 21/41 | (2011.01) | |
| H04N 21/23 | (2011.01) | |
| H04N 21/258 | (2011.01) | |
| H04N 21/84 | (2011.01) | |
| G06F 3/14 | (2006.01) | |

(52) U.S. Cl.
CPC ........ H04N 21/4126 (2013.01); G06F 3/1454 (2013.01); H04N 21/23 (2013.01); H04N 21/25825 (2013.01); H04N 21/84 (2013.01); G09G 2340/0407 (2013.01); G09G 2350/00 (2013.01); G09G 2352/00 (2013.01); G09G 2370/04 (2013.01); G09G 2370/16 (2013.01)

(58) Field of Classification Search
CPC .................................................. H04N 21/4122
See application file for complete search history.

(56) References Cited

U.S. PATENT DOCUMENTS

| | | |
|---|---|---|
| 4,791,554 A | 12/1988 | Hirota et al. |
| 5,828,370 A | 10/1998 | Moeller et al. |
| 5,835,723 A | 11/1998 | Andrews et al. |
| 5,925,137 A | 7/1999 | Okanoue et al. |
| 6,014,706 A | 1/2000 | Cannon et al. |

(Continued)

FOREIGN PATENT DOCUMENTS

| | | |
|---|---|---|
| CN | 1437355 A | 8/2003 |
| CN | 1561609 A | 1/2005 |

(Continued)

OTHER PUBLICATIONS

Apple, Safari Web Content Guide, Chapter 6, Handling Events, Oct. 12, 2011, retrieved from http://developer.apple.com/library/safari/#documentation/AppleApplications/Reference/SafariWebContent/HandlingEvents/HandlingEvents.html.

(Continued)

*Primary Examiner* — Fernando Alcon
(74) *Attorney, Agent, or Firm* — Campbell C. Chiang

(57) ABSTRACT

As part of a communication session, a wireless source device can transmit video component data and metadata to a wireless sink device. The wireless source device can intercept the video component data prior to the video component data being rendered by the wireless source device, and the wireless sink device can generate a frame of video data based on the video component data and the metadata.

17 Claims, 8 Drawing Sheets

(56) References Cited

U.S. PATENT DOCUMENTS

| | | | |
|---|---|---|---|
| 6,049,549 A | 4/2000 | Ganz et al. |
| 6,195,680 B1 | 2/2001 | Goldszmidt et al. |
| 6,252,889 B1 | 6/2001 | Patki et al. |
| 6,266,690 B1 | 7/2001 | Shankarappa et al. |
| 6,400,720 B1 | 6/2002 | Ovadia et al. |
| 6,424,626 B1 | 7/2002 | Kidambi et al. |
| 6,515,992 B1 | 2/2003 | Weston et al. |
| 6,594,699 B1 | 7/2003 | Sahai et al. |
| 6,608,841 B1 | 8/2003 | Koodli |
| 6,748,195 B1 | 6/2004 | Phillips |
| 6,760,772 B2 | 7/2004 | Zou et al. |
| 6,801,530 B1 | 10/2004 | Brandt et al. |
| 6,876,857 B1 | 4/2005 | Nee et al. |
| 6,917,976 B1 | 7/2005 | Slaughter et al. |
| 6,963,921 B1 | 11/2005 | Yang et al. |
| 7,035,281 B1 | 4/2006 | Spearman et al. |
| 7,072,984 B1 | 7/2006 | Polonsky et al. |
| 7,080,151 B1 | 7/2006 | Borella et al. |
| 7,085,420 B2 | 8/2006 | Mehrotra |
| 7,324,462 B1 | 1/2008 | Page et al. |
| 7,328,021 B1 | 2/2008 | Satapathy |
| 7,333,464 B2 | 2/2008 | Yang et al. |
| 7,366,204 B2 | 4/2008 | Kang et al. |
| 7,373,415 B1 | 5/2008 | Deshan et al. |
| 7,376,155 B2 | 5/2008 | Ahn et al. |
| 7,477,659 B1 | 1/2009 | Nee et al. |
| 7,519,470 B2 | 4/2009 | Brasche et al. |
| 7,529,823 B2 | 5/2009 | Trufinescu et al. |
| 7,565,357 B2 | 7/2009 | Rao |
| 7,688,859 B2 | 3/2010 | Chen et al. |
| 7,696,980 B1 | 4/2010 | Piot et al. |
| 7,712,670 B2 | 5/2010 | Sauerwein, Jr. et al. |
| 7,716,385 B2 | 5/2010 | Saint-Hilaire et al. |
| 7,719,972 B2 | 5/2010 | Yuan et al. |
| 7,720,096 B2 | 5/2010 | Klemets |
| 7,768,536 B2 | 8/2010 | Hyatt |
| 7,835,406 B2 | 11/2010 | Oran et al. |
| 7,868,890 B2 | 1/2011 | Ludwin et al. |
| 7,881,315 B2 | 2/2011 | Haveson et al. |
| 7,929,475 B2 | 4/2011 | Simonson et al. |
| 8,001,384 B2 | 8/2011 | Yamamoto et al. |
| 8,102,849 B2 | 1/2012 | Martinez Bauza et al. |
| 8,157,168 B2 | 4/2012 | Sauerwein, Jr. et al. |
| 8,364,201 B1 | 1/2013 | Fujisaki |
| 8,406,961 B2 | 3/2013 | Pathak et al. |
| 8,428,048 B2 | 4/2013 | Walker et al. |
| 8,437,347 B2 | 5/2013 | Casaccia et al. |
| 8,466,870 B2 | 6/2013 | Cohen et al. |
| 8,517,251 B2 | 8/2013 | Cohen et al. |
| 8,593,996 B2 | 11/2013 | Lee et al. |
| 8,605,048 B2 | 12/2013 | Ye et al. |
| 8,605,584 B2 | 12/2013 | Leung et al. |
| 8,612,619 B2 | 12/2013 | Guo et al. |
| 8,724,696 B2* | 5/2014 | Byford et al. ............ 375/240.01 |
| 8,966,131 B2 | 2/2015 | Huang et al. |
| 2002/0007494 A1 | 1/2002 | Hodge |
| 2002/0035621 A1 | 3/2002 | Zintel et al. |
| 2002/0097718 A1 | 7/2002 | Korus et al. |
| 2002/0145622 A1* | 10/2002 | Kauffman ............ G06F 17/3028 |
| | | 715/723 |
| 2003/0031152 A1 | 2/2003 | Gohda et al. |
| 2003/0064752 A1 | 4/2003 | Adachi et al. |
| 2003/0110297 A1 | 6/2003 | Tabatabai et al. |
| 2003/0142631 A1 | 7/2003 | Silvester |
| 2003/0152098 A1 | 8/2003 | Zhu |
| 2003/0167171 A1 | 9/2003 | Calderone et al. |
| 2003/0225737 A1 | 12/2003 | Mathews |
| 2004/0039934 A1 | 2/2004 | Land et al. |
| 2004/0071169 A1 | 4/2004 | Abe et al. |
| 2004/0083284 A1 | 4/2004 | Ofek et al. |
| 2004/0103282 A1 | 5/2004 | Meier et al. |
| 2004/0147264 A1 | 7/2004 | Ogawa |
| 2004/0160967 A1 | 8/2004 | Fujita et al. |
| 2004/0202249 A1 | 10/2004 | Lo et al. |
| 2004/0214571 A1 | 10/2004 | Hong |
| 2005/0021810 A1* | 1/2005 | Umemura et al. ............ 709/231 |
| 2005/0044142 A1 | 2/2005 | Garrec et al. |
| 2005/0058090 A1 | 3/2005 | Chang et al. |
| 2005/0060750 A1 | 3/2005 | Oka et al. |
| 2005/0085239 A1 | 4/2005 | Cedervall |
| 2005/0096086 A1 | 5/2005 | Singamsetty |
| 2005/0102699 A1 | 5/2005 | Kim et al. |
| 2005/0111361 A1 | 5/2005 | Hosein |
| 2005/0130611 A1 | 6/2005 | Lu et al. |
| 2005/0136990 A1 | 6/2005 | Hardacker et al. |
| 2005/0138193 A1 | 6/2005 | Encarnacion et al. |
| 2005/0144225 A1 | 6/2005 | Anderson et al. |
| 2005/0149976 A1 | 7/2005 | Lupoi et al. |
| 2005/0152330 A1 | 7/2005 | Stephens et al. |
| 2005/0166241 A1 | 7/2005 | Kim et al. |
| 2005/0175321 A1 | 8/2005 | Aridome et al. |
| 2005/0176429 A1 | 8/2005 | Lee et al. |
| 2005/0198663 A1 | 9/2005 | Chaney et al. |
| 2005/0219266 A1 | 10/2005 | Koutani et al. |
| 2005/0266798 A1 | 12/2005 | Moloney et al. |
| 2005/0267946 A1 | 12/2005 | An et al. |
| 2006/0002320 A1 | 1/2006 | Costa-Requena et al. |
| 2006/0002395 A1 | 1/2006 | Araki et al. |
| 2006/0013182 A1 | 1/2006 | Balasubramanian et al. |
| 2006/0028398 A1 | 2/2006 | Willmore |
| 2006/0050640 A1 | 3/2006 | Jin et al. |
| 2006/0053459 A1 | 3/2006 | Simerly et al. |
| 2006/0058003 A1 | 3/2006 | Lee |
| 2006/0069797 A1 | 3/2006 | Abdo et al. |
| 2006/0083194 A1* | 4/2006 | Dhrimaj ............ H04M 1/7253 |
| | | 370/328 |
| 2006/0098593 A1 | 5/2006 | Edvardsen et al. |
| 2006/0101146 A1 | 5/2006 | Wang |
| 2006/0103508 A1 | 5/2006 | Sato |
| 2006/0133414 A1 | 6/2006 | Luoma et al. |
| 2006/0136597 A1* | 6/2006 | Shabtai ............ H04L 29/06027 |
| | | 709/231 |
| 2006/0136963 A1* | 6/2006 | Oh et al. ......................... 725/35 |
| 2006/0146009 A1 | 7/2006 | Syrbe et al. |
| 2006/0187964 A1 | 8/2006 | Li et al. |
| 2006/0198448 A1 | 9/2006 | Aissi et al. |
| 2006/0199537 A1 | 9/2006 | Eisenbach |
| 2006/0202809 A1 | 9/2006 | Lane et al. |
| 2006/0203805 A1 | 9/2006 | Karacali-Akyamac et al. |
| 2006/0206340 A1 | 9/2006 | Silvera et al. |
| 2006/0209787 A1 | 9/2006 | Okuda |
| 2006/0218298 A1 | 9/2006 | Knapp et al. |
| 2006/0222246 A1 | 10/2006 | Murai et al. |
| 2006/0223442 A1 | 10/2006 | Stephens |
| 2006/0233191 A1 | 10/2006 | Pirzada et al. |
| 2006/0236250 A1 | 10/2006 | Gargi |
| 2006/0256851 A1 | 11/2006 | Wang et al. |
| 2006/0268869 A1 | 11/2006 | Boers et al. |
| 2006/0270417 A1 | 11/2006 | Chi |
| 2006/0288008 A1 | 12/2006 | Bhattiprolu et al. |
| 2007/0004387 A1 | 1/2007 | Gadamsetty et al. |
| 2007/0008922 A1 | 1/2007 | Abhishek et al. |
| 2007/0016654 A1 | 1/2007 | Bowles et al. |
| 2007/0022195 A1 | 1/2007 | Kawano et al. |
| 2007/0037600 A1 | 2/2007 | Fukuda |
| 2007/0043550 A1 | 2/2007 | Tzruya |
| 2007/0057865 A1 | 3/2007 | Song et al. |
| 2007/0057885 A1 | 3/2007 | Kurumisawa et al. |
| 2007/0061433 A1 | 3/2007 | Reynolds et al. |
| 2007/0104215 A1 | 5/2007 | Wang et al. |
| 2007/0126715 A1 | 6/2007 | Funamoto |
| 2007/0141984 A1 | 6/2007 | Kuehnel et al. |
| 2007/0141988 A1 | 6/2007 | Kuehnel et al. |
| 2007/0157283 A1 | 7/2007 | Setlur et al. |
| 2007/0162945 A1 | 7/2007 | Mills |
| 2007/0171910 A1 | 7/2007 | Kumar et al. |
| 2007/0182728 A1 | 8/2007 | Fujimori |
| 2007/0211041 A1 | 9/2007 | Lai et al. |
| 2007/0259662 A1 | 11/2007 | Lee et al. |
| 2007/0264988 A1 | 11/2007 | Wilson, Jr. et al. |
| 2007/0264991 A1 | 11/2007 | Jones et al. |
| 2007/0274400 A1 | 11/2007 | Murai et al. |
| 2007/0291636 A1 | 12/2007 | Rajagopal et al. |
| 2007/0292135 A1 | 12/2007 | Guo et al. |

(56) References Cited

U.S. PATENT DOCUMENTS

| | | |
|---|---|---|
| 2007/0299778 A1 | 12/2007 | Haveson et al. |
| 2008/0005348 A1 | 1/2008 | Kosiba et al. |
| 2008/0013658 A1 | 1/2008 | Lewis et al. |
| 2008/0018657 A1 | 1/2008 | Montag |
| 2008/0031210 A1 | 2/2008 | Abhishek et al. |
| 2008/0037506 A1 | 2/2008 | Dharmaraju et al. |
| 2008/0037785 A1 | 2/2008 | Gantman et al. |
| 2008/0045149 A1 | 2/2008 | Dharmaraju et al. |
| 2008/0046944 A1* | 2/2008 | Lee et al. .................. 725/110 |
| 2008/0109763 A1 | 5/2008 | Lee |
| 2008/0115183 A1 | 5/2008 | Zato et al. |
| 2008/0129879 A1 | 6/2008 | Shao et al. |
| 2008/0130612 A1 | 6/2008 | Gorokhov et al. |
| 2008/0155057 A1 | 6/2008 | Khedouri et al. |
| 2008/0198847 A1 | 8/2008 | Yamagishi et al. |
| 2008/0198848 A1 | 8/2008 | Yamagishi |
| 2008/0205394 A1 | 8/2008 | Deshpande et al. |
| 2008/0211766 A1 | 9/2008 | Westerman et al. |
| 2008/0231595 A1 | 9/2008 | Krantz et al. |
| 2008/0232402 A1 | 9/2008 | Higuchi et al. |
| 2008/0270532 A1 | 10/2008 | Billmaier et al. |
| 2008/0273485 A1 | 11/2008 | Tsigler et al. |
| 2008/0291863 A1 | 11/2008 | Agren |
| 2008/0304408 A1 | 12/2008 | Kraemer et al. |
| 2008/0307349 A1 | 12/2008 | Wang et al. |
| 2008/0310391 A1 | 12/2008 | Schneidman et al. |
| 2009/0002263 A1 | 1/2009 | Pasetto |
| 2009/0010259 A1 | 1/2009 | Sirotkin |
| 2009/0013081 A1 | 1/2009 | Laroia et al. |
| 2009/0031035 A1 | 1/2009 | Dharmaraju et al. |
| 2009/0070404 A1 | 3/2009 | Mazzaferri |
| 2009/0083431 A1 | 3/2009 | Balachandran et al. |
| 2009/0089453 A1 | 4/2009 | Bohan et al. |
| 2009/0091656 A1 | 4/2009 | Kitaru et al. |
| 2009/0094317 A1 | 4/2009 | Venkitaraman |
| 2009/0102838 A1 | 4/2009 | Bullard et al. |
| 2009/0109974 A1 | 4/2009 | Shetty et al. |
| 2009/0133122 A1 | 5/2009 | Koo et al. |
| 2009/0141180 A1 | 6/2009 | Kondo et al. |
| 2009/0141692 A1 | 6/2009 | Kasslin et al. |
| 2009/0147139 A1 | 6/2009 | Watanabe et al. |
| 2009/0153737 A1 | 6/2009 | Glen |
| 2009/0162029 A1 | 6/2009 | Glen |
| 2009/0189860 A1 | 7/2009 | Su et al. |
| 2009/0191926 A1 | 7/2009 | Doyle |
| 2009/0201423 A1 | 8/2009 | Sugiyama et al. |
| 2009/0252130 A1 | 10/2009 | Sheth et al. |
| 2009/0288125 A1 | 11/2009 | Morioka |
| 2009/0300676 A1 | 12/2009 | Harter, Jr. et al. |
| 2009/0323562 A1 | 12/2009 | Cho et al. |
| 2010/0027467 A1 | 2/2010 | Wu et al. |
| 2010/0073334 A1 | 3/2010 | Cohen et al. |
| 2010/0105334 A1 | 4/2010 | Terry et al. |
| 2010/0118200 A1 | 5/2010 | Gelman et al. |
| 2010/0123826 A1 | 5/2010 | Sagi |
| 2010/0127847 A1 | 5/2010 | Evans et al. |
| 2010/0134312 A1 | 6/2010 | Park et al. |
| 2010/0146143 A1 | 6/2010 | Thorup |
| 2010/0146583 A1 | 6/2010 | Prehofer et al. |
| 2010/0153553 A1 | 6/2010 | Sheth et al. |
| 2010/0156916 A1* | 6/2010 | Muikaichi ............. G09G 5/14 345/536 |
| 2010/0166017 A1 | 7/2010 | Na et al. |
| 2010/0172320 A1 | 7/2010 | Suzuki |
| 2010/0189131 A1 | 7/2010 | Branam et al. |
| 2010/0199187 A1 | 8/2010 | Lin et al. |
| 2010/0205321 A1 | 8/2010 | Martinez Bauza et al. |
| 2010/0245296 A1 | 9/2010 | Sip et al. |
| 2010/0257238 A1 | 10/2010 | Jeon et al. |
| 2010/0257450 A1 | 10/2010 | Go et al. |
| 2010/0281103 A1 | 11/2010 | Imai et al. |
| 2010/0289871 A1 | 11/2010 | Tatsuta et al. |
| 2010/0289872 A1 | 11/2010 | Funabiki et al. |
| 2010/0293287 A1 | 11/2010 | Kobayashi |
| 2010/0306344 A1 | 12/2010 | Athas et al. |
| 2011/0002255 A1 | 1/2011 | Dharmaraju et al. |
| 2011/0019620 A1 | 1/2011 | Wang |
| 2011/0037447 A1 | 2/2011 | Mair |
| 2011/0051602 A1 | 3/2011 | Matthews et al. |
| 2011/0069720 A1 | 3/2011 | Jacobs et al. |
| 2011/0072473 A1 | 3/2011 | Funabiki et al. |
| 2011/0107388 A1 | 5/2011 | Lee et al. |
| 2011/0115818 A1 | 5/2011 | Chung et al. |
| 2011/0128442 A1 | 6/2011 | Blanchard et al. |
| 2011/0145879 A1 | 6/2011 | Rajamani et al. |
| 2011/0149806 A1 | 6/2011 | Verma et al. |
| 2011/0157470 A1 | 6/2011 | Tsuruga et al. |
| 2011/0164058 A1 | 7/2011 | Lemay |
| 2011/0167176 A1 | 7/2011 | Yew et al. |
| 2011/0167181 A1 | 7/2011 | Minoo et al. |
| 2011/0182195 A1 | 7/2011 | Oikawa |
| 2011/0186138 A1 | 8/2011 | Hanna et al. |
| 2011/0205433 A1 | 8/2011 | Altmann |
| 2011/0216239 A1 | 9/2011 | Raveendran |
| 2011/0216785 A1 | 9/2011 | Begen et al. |
| 2011/0216829 A1 | 9/2011 | Raveendran |
| 2011/0281557 A1 | 11/2011 | Choi et al. |
| 2011/0314168 A1 | 12/2011 | Bathiche et al. |
| 2012/0036543 A1 | 2/2012 | George et al. |
| 2012/0036549 A1 | 2/2012 | Patel et al. |
| 2012/0038825 A1 | 2/2012 | Kanonich |
| 2012/0044985 A1 | 2/2012 | Tao et al. |
| 2012/0060100 A1 | 3/2012 | Sherwood et al. |
| 2012/0084670 A1 | 4/2012 | Momchilov |
| 2012/0099566 A1 | 4/2012 | Laine et al. |
| 2012/0113113 A1 | 5/2012 | Hong |
| 2012/0147799 A1 | 6/2012 | Nagara et al. |
| 2012/0154386 A1 | 6/2012 | Nagara et al. |
| 2012/0162537 A1 | 6/2012 | Maddali et al. |
| 2012/0249575 A1 | 10/2012 | Krolczyk et al. |
| 2013/0002949 A1 | 1/2013 | Raveendran et al. |
| 2013/0003621 A1 | 1/2013 | Huang et al. |
| 2013/0003622 A1 | 1/2013 | Huang et al. |
| 2013/0003623 A1 | 1/2013 | Raveendran et al. |
| 2013/0003624 A1 | 1/2013 | Huang et al. |
| 2013/0009873 A1 | 1/2013 | Huang et al. |
| 2013/0009887 A1 | 1/2013 | Huang et al. |
| 2013/0009996 A1 | 1/2013 | Raveendran et al. |
| 2013/0013318 A1 | 1/2013 | Huang et al. |
| 2013/0033435 A1 | 2/2013 | Raveendran et al. |
| 2013/0033496 A1 | 2/2013 | Raveendran et al. |
| 2013/0128948 A1 | 5/2013 | Rabii et al. |
| 2013/0139210 A1 | 5/2013 | Huang et al. |
| 2013/0174208 A1 | 7/2013 | Lee et al. |
| 2013/0188632 A1 | 7/2013 | Sheth et al. |
| 2013/0195119 A1 | 8/2013 | Huang et al. |
| 2013/0215142 A1 | 8/2013 | Park |
| 2013/0222301 A1 | 8/2013 | Lee et al. |
| 2013/0227152 A1 | 8/2013 | Lee et al. |
| 2013/0234913 A1 | 9/2013 | Thangadorai et al. |
| 2013/0238702 A1 | 9/2013 | Sheth et al. |
| 2013/0246565 A1 | 9/2013 | Froelicher et al. |
| 2013/0246665 A1 | 9/2013 | Lee et al. |
| 2013/0272628 A1* | 10/2013 | Lee ............................ 382/294 |
| 2013/0297936 A1 | 11/2013 | Khosravi et al. |
| 2013/0304794 A1 | 11/2013 | Verma et al. |
| 2014/0019653 A1 | 1/2014 | Amchislavsky et al. |
| 2014/0022146 A1 | 1/2014 | Thangadorai et al. |
| 2014/0096164 A1 | 4/2014 | Bei et al. |
| 2014/0120829 A1 | 5/2014 | Bhamidipati et al. |
| 2014/0210693 A1 | 7/2014 | Bhamidipati et al. |
| 2014/0372620 A1 | 12/2014 | Vedula et al. |

FOREIGN PATENT DOCUMENTS

| | | |
|---|---|---|
| CN | 1578452 A | 2/2005 |
| CN | 1592884 A | 3/2005 |
| CN | 1596004 A | 3/2005 |
| CN | 1656750 A | 8/2005 |
| CN | 1662944 A | 8/2005 |
| CN | 1774106 A | 5/2006 |
| CN | 1832481 A | 9/2006 |
| CN | 1893356 A | 1/2007 |
| CN | 1983945 A | 6/2007 |

(56) References Cited

FOREIGN PATENT DOCUMENTS

| | | |
|---|---|---|
| CN | 101002453 A | 7/2007 |
| CN | 101018330 A | 8/2007 |
| CN | 101083825 A | 12/2007 |
| CN | 101223778 A | 7/2008 |
| CN | 101247249 A | 8/2008 |
| CN | 101247250 A | 8/2008 |
| CN | 101822050 A | 9/2010 |
| CN | 101849224 A | 9/2010 |
| CN | 101849416 A | 9/2010 |
| EP | 1203080 A2 | 5/2002 |
| EP | 1206080 A1 | 5/2002 |
| EP | 1233326 A2 | 8/2002 |
| EP | 1235392 A1 | 8/2002 |
| EP | 1325591 A1 | 7/2003 |
| EP | 1333373 A1 | 8/2003 |
| EP | 1385336 A2 | 1/2004 |
| EP | 1423778 A2 | 6/2004 |
| EP | 1507369 A1 | 2/2005 |
| EP | 1517228 A2 | 3/2005 |
| EP | 1550264 A1 | 7/2005 |
| EP | 1653678 A2 | 5/2006 |
| EP | 1944946 | 7/2008 |
| EP | 1959685 A2 | 8/2008 |
| EP | 1959686 A2 | 8/2008 |
| EP | 2012461 | 1/2009 |
| EP | 2037683 | 3/2009 |
| EP | 2190202 A1 | 5/2010 |
| GB | 2383920 A | 7/2003 |
| JP | H06110424 A | 4/1994 |
| JP | H07104722 A | 4/1995 |
| JP | H07129364 A | 5/1995 |
| JP | H07240806 A | 9/1995 |
| JP | H08237628 A | 9/1996 |
| JP | H09325923 A | 12/1997 |
| JP | 2000278320 A | 10/2000 |
| JP | 2000354031 A | 12/2000 |
| JP | 2001034250 A | 2/2001 |
| JP | 2001282673 A | 10/2001 |
| JP | 2001352533 A | 12/2001 |
| JP | 2002064725 A | 2/2002 |
| JP | 2002142210 A | 5/2002 |
| JP | 2002165248 A | 6/2002 |
| JP | 2002262341 A | 9/2002 |
| JP | 2002330381 A | 11/2002 |
| JP | 2003050761 A | 2/2003 |
| JP | 2003102060 A | 4/2003 |
| JP | 2003124991 A | 4/2003 |
| JP | 2003143237 A | 5/2003 |
| JP | 2003271279 A | 9/2003 |
| JP | 2003304523 A | 10/2003 |
| JP | 2004054783 A | 2/2004 |
| JP | 2004505531 A | 2/2004 |
| JP | 2004086550 A | 3/2004 |
| JP | 2004120441 A | 4/2004 |
| JP | 2004192140 A | 7/2004 |
| JP | 2004199454 A | 7/2004 |
| JP | 2004265329 A | 9/2004 |
| JP | 2004274159 A | 9/2004 |
| JP | 2004531916 | 10/2004 |
| JP | 2005049666 A | 2/2005 |
| JP | 2005515714 A | 5/2005 |
| JP | 2005142808 A | 6/2005 |
| JP | 2005148450 A | 6/2005 |
| JP | 2005204016 A | 7/2005 |
| JP | 2006500860 A | 1/2006 |
| JP | 2006060448 A | 3/2006 |
| JP | 2006060589 A | 3/2006 |
| JP | 2006060596 A | 3/2006 |
| JP | 2006100885 A | 4/2006 |
| JP | 2006514353 A | 4/2006 |
| JP | 2006121562 A | 5/2006 |
| JP | 2006155327 A | 6/2006 |
| JP | 2006172423 A | 6/2006 |
| JP | 2006197401 A | 7/2006 |
| JP | 2006254328 A | 9/2006 |
| JP | 2006285302 A | 10/2006 |
| JP | 2007043685 A | 2/2007 |
| JP | 2007082070 A | 3/2007 |
| JP | 2007505580 A | 3/2007 |
| JP | 2007088539 A | 4/2007 |
| JP | 2007508783 A | 4/2007 |
| JP | 2007206644 A | 8/2007 |
| JP | 2007271908 A | 10/2007 |
| JP | 2007274150 A | 10/2007 |
| JP | 2007282219 A | 10/2007 |
| JP | 2007316405 A | 12/2007 |
| JP | 2008508600 A | 3/2008 |
| JP | 2008079139 A | 4/2008 |
| JP | 2008191929 A | 8/2008 |
| JP | 2008293361 A | 12/2008 |
| JP | 2008301249 A | 12/2008 |
| JP | 2008547264 A | 12/2008 |
| JP | 2009021698 A | 1/2009 |
| JP | 2009502067 A | 1/2009 |
| JP | 2009033348 A | 2/2009 |
| JP | 2009071580 A | 4/2009 |
| JP | 2009083896 A | 4/2009 |
| JP | 2009147893 A | 7/2009 |
| JP | 2009537051 A | 10/2009 |
| JP | 2010033548 A | 2/2010 |
| JP | 2010068537 A | 3/2010 |
| JP | 2010098344 A | 4/2010 |
| JP | 2010178147 A | 8/2010 |
| JP | 2012044746 A | 3/2012 |
| JP | 2012525773 A | 10/2012 |
| JP | 2014507862 A | 3/2014 |
| KR | 100398610 B1 | 9/2003 |
| KR | 1020050007533 | 1/2005 |
| KR | 20060060717 A | 6/2006 |
| KR | 20080065633 A | 7/2008 |
| RU | 2207723 C1 | 6/2003 |
| RU | 2005113275 A | 10/2005 |
| RU | 2269873 C2 | 2/2006 |
| TW | 496058 | 7/2002 |
| TW | I234954 | 6/2005 |
| TW | I239179 | 9/2005 |
| TW | 200618653 | 6/2006 |
| TW | 200838310 A | 9/2008 |
| TW | 200943168 A | 10/2009 |
| WO | 0184291 A1 | 11/2001 |
| WO | WO0210942 | 2/2002 |
| WO | 0223825 A1 | 3/2002 |
| WO | WO0249314 A2 | 6/2002 |
| WO | 03030451 A1 | 4/2003 |
| WO | 03061240 A1 | 7/2003 |
| WO | WO-03104834 A2 | 12/2003 |
| WO | 2004030351 A1 | 4/2004 |
| WO | 2004034646 A1 | 4/2004 |
| WO | 2004051962 A1 | 6/2004 |
| WO | WO-2005107187 A1 | 11/2005 |
| WO | WO-2005109781 A1 | 11/2005 |
| WO | WO2005122509 | 12/2005 |
| WO | 2006007352 A1 | 1/2006 |
| WO | 2006020304 A2 | 2/2006 |
| WO | 2006135289 A1 | 12/2006 |
| WO | 2007009876 A1 | 1/2007 |
| WO | WO2007000757 | 1/2007 |
| WO | 2007013334 A1 | 2/2007 |
| WO | WO2007021269 | 2/2007 |
| WO | WO-2007033049 A2 | 3/2007 |
| WO | 2007098425 A1 | 8/2007 |
| WO | 2007133483 A1 | 11/2007 |
| WO | 2007140342 A2 | 12/2007 |
| WO | 2007140344 A2 | 12/2007 |
| WO | 2008027724 A1 | 3/2008 |
| WO | 2008087713 A1 | 7/2008 |
| WO | 2009015322 A2 | 1/2009 |
| WO | 2009040918 A1 | 4/2009 |
| WO | 2010120878 A2 | 10/2010 |
| WO | 2010126727 A2 | 11/2010 |

(56) References Cited

FOREIGN PATENT DOCUMENTS

| WO | 2011002141 A1 | 1/2011 |
|---|---|---|
| WO | 2011003089 A1 | 1/2011 |
| WO | 2012096546 A2 | 7/2012 |

OTHER PUBLICATIONS

Brandenburg, et al., AVTCore, RTCP for inter-destination media syncronization, Internet Draft, draft-ietf-avtcore-idms-092.txt, Oct. 31, 2011.
Euihyeok Kwon, et al., "An idle timeslot reuse scheme for IEEE 802.15.3 high-rate wireless personal area networks" Vehicular Technology Conference, 2005. VTC—2005—Fall. 2005 IEEE 62nd Dallas, TX, USA Sep. 25-28, 2005, Piscataway, NJ, USA, IEEE, Sep. 25.
Helmy A: "Architectural framework for large-scale multicast in mobile ad hoc networks" Proceedings of IEEE International Conference on Communications—Apr. 28-May 2, 2002—New York, NY, USA, IEEE, Piscataway, NJ, USA LNKDDOI: 10.1109/ICC. 2002.997206, vol. 4, Apr. 28, 2002, pp. 2036-2042, XP010589844 ISBN: 978-0-7803-7400-3.
IEEE 802.15.3, "Part 15.3: Wireless Medium Access Control (MAC) and Physical Layer (PHY) Specifications for High Rate Wireless Personal Area Networks (WPANs)," IEEE Computer Society, 2003.
McKnight et al. (TPRC 30th Research Conference on Communication, Information and Internet Policy, Aug. 2002) Virtual Markets in Wireless Grids: Peering Policy Obstacles, hereinafter referred as McKnight, pp. 1 and 20.
Miller B., et al., "Mapping salutation architecture APIs to Bluetooth service discovery layer," Bluetooth White Paper, [Online} pp. 1-25, Jul. 1, 1999, XP002511956.
MSDN DirectShow, retrieved Nov. 28, 2011 from: http://msdn.microsoft.com/en-us/library/dd375454(VS.85).aspx.
MSDN Windows Sockets 2, retrieved Nov. 28, 2011 from: http://msdn.microsoft.com/en-us/library/ms740673(VS.85).aspx.
Myers, et al: "Collaboration Using Multiple PDAS Connected to a PC," Proceedings of the ACM Conference on Computer Supported Cooperative Work (CSCW), Nov 14, 1998, pp. 285-294, ISBN: 978-1-58113-009-6.
Nordbotten, N.A. et al., "Methods for service discovery in Bluetooth scatternets," Computer Communications, Elsevier Science Publishers BV, Amdsterdam, NL, vol. 27, No. 11, Jul. 1, 2004, pp. 1087-1096, XP004503638.
Shoji Y., et al., "Research and Standardization activty for IEEE802. 15.3c mmW WPAN: (2) Target applications and Usage Models", IEICE Tech. Rep., vol. 106, No. 555, RCS2006-279, pp. 179-182, Feb. 2007.
Zhanping Yin et al: "Third-party handshake protocol for efficient peer discovery in IEEE 802.15.3 WPANs" Broadband Networks, 2005 2nd International Conference on Boston, MA Oct. 3-7, 2005, Piscataway, NJ, USA IEEE, Oct. 3, 2005, pp. 902-911, XP010890303.
Casner, S., et al., "Compressing IP/UDP/RTP Headers for Low-Speed Serial Links," IETF Network Working Group, RFC 2508 (Feb. 1999).
Gentric., et al., "RTP Payload Format for MPEG-4 Streams", Internet Engineering Task Force. draft-ietf-avt-mpeg4-multisl-03. txt, Nov. 2001, pp. 13,14,25 and 33.
Handley, M. et al., "SDP: Session Description Protocol" Network Working Group, Request for Comments: 2327, Category: Standards Track. ISI/LBNL, Apr. 1998. pp. 1-42.
"Bluetooth Specification Version 1.1" published Feb. 22, 2001; Section 1 pp. 41-42; Section 2.1, p. 43; Section 4.1-2, pp. 47-50; Section 10.9, p. 120; and Section 11, pp. 126-137.
Byungjoo Lee, U.S. Appl. No. 61/433,942, filed Jan. 18, 2011.
Taiwan Search Report—TW096140444—TIPO—Sep. 16, 2013.
Taiwan Search Report—TW098111391—TIPO—Nov. 1, 2013.
Basso et al., "RTP Payload Format for MPEG-4 Streams; draft-ietf-avt-mpeg4-multisi-03.txt", vol. avt, No. 3, Nov. 1, 2001, XP015015620, ISSN: 0000-0004.
Co-pending U.S. Appl. No. 10/236,657, filed Sep. 6, 2002.
Doerffel T., "User manual iTALC—Intelligent Teaching and Learning with Computers Version 1.0.4", Jan. 29, 2008, pp. 1-17, XP55025785, Retrieved from the Internet: URL:http://italc.sourceforge.net/italc-manual-2007-01-29.pdf [retrieved on Apr. 26, 2012] the whole document.
International Search Report and Written Opinion—PCT/US2012/023842—ISA/EPO—May 18, 2012.
Media Content Distribution (MCD); 3D 1-30 Gaming Graphics Delivery Overview, Technical Report, European Telecommunications Standards Institute (ETSI), 650, Route Des Lucioles ; F-06921 Sophia-Antipolis ; France, vol. MCD, No. V1. 1. 1, Dec. 1, 2010, XP014061814, section 5.
Mitrea M., et al., "Novel approaches to 1-30 remote display representations: BiFS-based solution and its deployment within the FP7 MobiThin project", 87. MPEG Meeting; Feb. 2, 2009-Feb. 6, 2009; Lausanne; (Motion Picture Expert Group or ISO/IEC JTC1/SC29/WG11) No. M16058, Jan. 29, 2009, XP030044655, sections 2 and 3.
Nave I et al., "Games@large graphics streaming architecture" , Consumer Electronics, 2008. ISCE 2008. IEEE International Symposium on, IEEE, Piscataway, NJ, USA, Apr. 14, 2008, pp. 1-4, XP031283619, ISBN: 978-1-4244-2422-1 abstract col. 2-col. 6.
Schulzrinne, et al., "RTP: A Transport Protocol for Real-Time Applications", rfc3550.txt, Jul. 1, 2003, XP015009332, ISSN: 0000-0003.
Video Electronics Standards Association (VESA) Mobile Display Digital Interface Standard (MDDI), Jul. 2004.
Wenger et al., "RTP Payload Format for H.264 Video," Network Working Group, RFC 3984, Feb. 2005, 78 pp.
DDJ., "Research on Windows Programming with Visual C++, Final Issue, Overcoming WIN32 Hook Processing in MFC Programming", Feb. 1996 issue (vol. 5,No. 2, No. 61 in all), Shoeisha Co., Ltd., Feb. 1, 1996, pp. 66-77.
Hayakawa A., "Operate multiple machines by remote control software", VNCThing, MAC POWER, Japan, ASCII Corporation, Jun. 1, 2003, vol. 14, No. 6, p. 86.
Kinoshita K., "The Software" Everyone knows, Read this and everything will be clear, Standard software with freedom., Mac Fan, Japan, Mainichi Communications Inc., Sep. 1, 2007, vol. 15, No. 9, pp. 212-219.
"Raster Graphics" Wikipedia. Wikimedia Foundation, Jan. 29, 2011, Web, Apr. 1, 2015.
Ryo Yamaichi, Good to Remember! "Wisdom" for Troubleshooting, 68th Windows Q & A Hotline, Windows Server World, Japan, IDG Japan, Inc., Oct. 1, 2009, vol. 14, No. 10, pp. 104-107.
Wikipedia entry for UPnP List of UPnP AV media servers and clients (captured Aug. 20, 2010), pp. 1-10, Retrieved from the Internet , whole document.
Wikipedia entry of header (captured Aug. 30, 2010), 1 Page, Retrieved from the Internet , whole document.

* cited by examiner

LOW LATENCY WIRELESS DISPLAY FOR GRAPHICS

CLAIM OF PRIORITY

This application claims the benefit of U.S. Provisional Application No. 61/439,690 entitled "LOW LATENCY WIRELESS DISPLAY FOR GRAPHICS USING MATCHED MEDIA PROCESSOR," filed Feb. 4, 2011 and U.S. Provisional Application No. 61/584,021 entitled "SOURCE ADAPTATION BASED ON SINK CAPABILITIES," filed Jan. 6, 2012, the entire contents each of which are incorporated herein by reference in their entirety.

TECHNICAL FIELD

This disclosure relates to techniques for transmitting data between a wireless source device and a wireless sink device.

BACKGROUND

Wireless display (WD) or Wi-Fi Display (WFD) systems include a wireless source device and one or more wireless sink devices. The source device and each of the sink devices may be either mobile devices or wired devices with wireless communication capabilities. One or more of the source device and the sink devices may, for example, include mobile telephones, portable computers with wireless communication cards, personal digital assistants (PDAs), portable media players, or other such devices with wireless communication capabilities, including so-called "smart" phones and "smart" pads or tablets, e-readers, any of a wide variety of wireless displays or projectors, video gaming devices, or other types of wireless communication devices. One or more of the source device and the sink devices may also include wired devices such as televisions, desktop computers, monitors, projectors, and the like, that include communication capabilities.

The source device sends media data, such as audio video (AV) data, to one or more of the sink devices participating in a particular media share session. The media data may be played back at both a local display of the source device and at each of the displays of the sink devices. More specifically, each of the participating sink devices renders the received media data on its display screen and may output audio portions of the media data via audio equipment.

SUMMARY

This disclosure generally describes a system where a wireless source device can communicate with a wireless sink device. As part of a communication session, the wireless source device can transmit audio and video data to the wireless sink device, such that the wireless source device and wireless sink device render the same audio and video data at substantially the same time. Additionally, in some communication sessions, the wireless sink device can transmit user inputs received at the wireless sink device back to the wireless source device.

In one example, a method of transmitting video data from a wireless source device to a wireless sink device includes intercepting a video component prior to the video component being rendered at the wireless source device; generating metadata describing the video component; and, transmitting the video component and the metadata to the wireless sink device.

In another example, a wireless source device includes a metadata encoder configured to intercept a video component prior to rendering at the wireless source device and generate metadata describing the video component; and includes a transport unit configured to transmit the video component and the metadata to a wireless sink device.

In another example, a computer-readable storage medium storing instructions that upon execution by one or more processors cause the one or more processors to perform a method of transmitting video data from a wireless source device to a wireless sink device. The method includes intercepting a video component prior to rendering at the wireless source device; generating metadata describing the video component; and, transmitting the video component and the metadata to the wireless sink device.

In another example, a wireless source device is configured to transmit video data to a wireless sink device. The wireless source device includes means for intercepting a video component prior to rendering at the wireless source device; means for generating metadata describing the video component; and, means for transmitting the video component and the metadata to the wireless sink device.

In another example, a method of receiving video data from a wireless source device at a wireless sink includes receiving from a wireless source device a first type of video component data, a second type of video component data, and metadata, wherein the metadata identifies a position of image data for the first video component relative to image data for the second video component; and, generating a frame of video based on the first type of video component data, the second type of video component data, and the metadata.

In another example, a wireless sink device includes a transport unit configured to receive from a wireless source device a first type of video component data, a second type of video component data, and metadata, wherein the metadata identifies a position of image data for the first video component relative to image data for the second video component; and includes a metadata decoder configured to generate a frame of video based on the first type of video component data, the second type of video component data, and the metadata.

The details of one or more aspects of the disclosure are set forth in the accompanying drawings and the description below. Other features, objects, and advantages of the disclosure will be apparent from the description and drawings, and from the claims

DETAILED DESCRIPTION

Figure 1A:
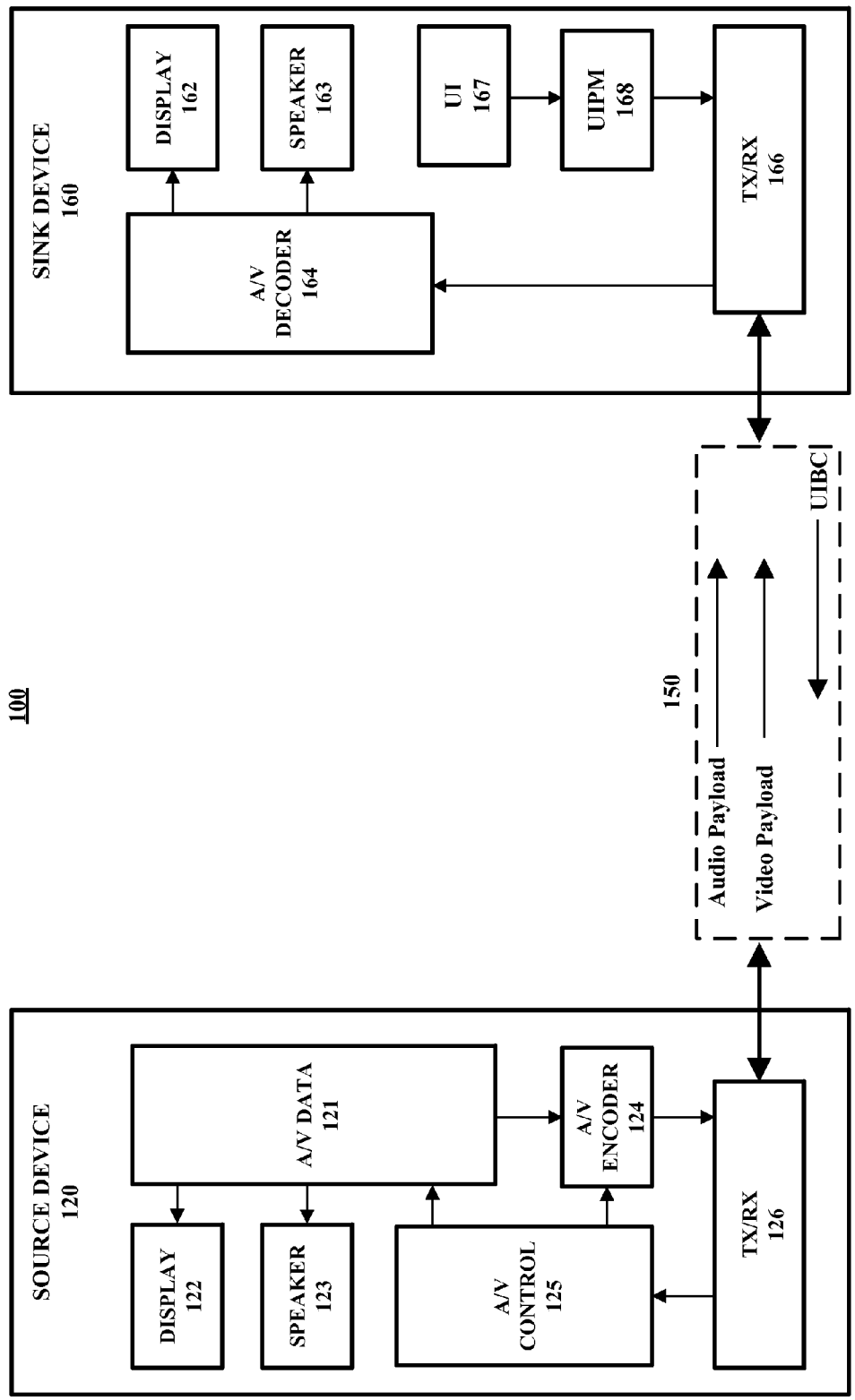
FIG. 1A is a block diagram illustrating an example of a source/sink system that may implement techniques of this disclosure.

This disclosure describes a system where a wireless source device can communicate with a wireless sink device. As part of a communication session, the wireless source device can transmit audio and video data to the wireless sink device, such that the wireless source device and wireless sink device render the same audio and video data at substantially the same time. Additionally, in some communication sessions, the wireless sink device can transmit user inputs received at the wireless sink device back to the wireless source device. In this manner, a user of the wireless sink device can control the wireless source device and control the content that is being transmitted from the wireless source device to the wireless sink device. As used in this disclosure, the term "wireless" is generally used to refer to devices that communicate wirelessly, but the devices may still have wires for other purposes, such as power.

Some wireless source devices transmit video data in the pixel domain. In some examples, this means that the wireless source device renders pixel data, captures a frame buffer storing the pixel data, encodes the pixel data, and transmits the encoded pixel data to a wireless sink device. In such a configuration, a user application such as a 3D video game may generate video component data that is to be converted into pixel data for local display and for transmission to a wireless sink device. As one example, an application running on a wireless source device may produce graphics by making calls to an application program interface (API). An API can provide a standardized interface for the user application to communicate with another software component, such as a graphics rendering application of an operating system, and can also provide a standardized interface for the user application to communicate with a hardware component, through a driver for example, such as a graphics processing unit (GPU). Based on the API calls of the user application, the graphics rendering application and the GPU can generate pixel data for local display and for transmission to a wireless sink device.

According to techniques of this disclosure, a wireless source device can be configured to operate in the graphics domain, in addition to the pixel domain. Accordingly, this disclosure generally describes wireless source devices and wireless sink devices configured to operate in a plurality of modes. One such mode can be a pixel domain mode, or pixel mode, as described above. In addition to the pixel mode, according to the techniques of this disclosure, wireless source devices and wireless sink devices may also operate in a graphics domain mode, also referred to in this disclosure as a video component mode. Aspects of this disclosure are described in reference to a pixel mode and a video component mode for ease of explanation. Wireless source and wireless sink devices, however, may implement the techniques of this disclosure without utilizing defined operating modes.

When operating in a video component mode, a wireless source device can intercept video component data, such as graphics API calls, prior to the video component data being rendered at the wireless source device and transmit the video component data to a wireless sink device. The wireless source device may still render the video component data for local display. The wireless sink device can generate pixel data based on the video component data received from the wireless source device, such that the wireless source device and wireless sink device render the same pixel data at approximately the same time. Thus, instead of transmitting encoded pixel data as described above, a wireless source device operating in a video component mode can transmit the video component data to the wireless sink device. Additionally, as part of operating in a video component mode, a wireless source device may add metadata to the video component data to assist the wireless sink device in rendering the graphics data. By operating in a video component mode, either in conjunction with or as an alternative to a pixel mode, source/sink systems may be able to reduce the consumption of system resources such as CPUs, memory, and other hardware components, which in some instances, may improve responsiveness of the system, improve performance on resource limited devices, and possibly extend battery life for battery powered devices. Operating in a video component mode may additionally reduce the amount of video-related data that needs to be transmitted from a source device to a sink, which may also improve system performance.

FIG. 1A is a block diagram illustrating an exemplary source/sink system 100 that may implement one or more of the techniques of this disclosure. As shown in FIG. 1A, system 100 includes source device 120 that communicates with sink device 160 via communication channel 150. Source device 120 may include a memory that stores audio/video (A/V) data 121, display 122, speaker 123, audio/video encoder 124 (also referred to as encoder 124), audio/video control module 125, and transmitter/receiver (TX/RX) unit 126. Sink device 160 may include display 162, speaker 163, audio/video decoder 164 (also referred to as decoder 164), transmitter/receiver unit 166, user input (UI) device 167, and user input processing module (UIPM) 168. The illustrated components constitute merely one example configuration for source/sink system 100. Other configurations may include fewer components than those illustrated or may include additional components.

In the example of FIG. 1A, source device 120 can display the video portion of audio/video data 121 on display 122 and can output the audio portion of audio/video data 121 on speaker 123. Audio/video data 121 may be stored locally on source device 120, accessed from an external storage medium such as a file server, hard drive, external memory, Blu-ray disc, DVD, or other physical storage medium, or may be streamed to source device 120 via a network connection such as the internet. In some instances audio/video data 121 may be captured in real-time via a camera and microphone of source device 120. Audio/video data 121 may include multimedia content such as movies, television shows, or music, but may also include real-time content generated by source device 120. Such real-time content, for example, may be produced by applications running on source device 120, or video data captured, e.g., as part of a video telephony session. As will be described in more detail, such real-time content, in some instances, may include a video frame of user input options available for a user to select. In some instances, audio/video data 121 may include video frames that are a combination of different types of content, such as a video frame of a movie or TV program that has user input options overlaid on the frame of video.

In addition to rendering audio/video data 121 locally via display 122 and speaker 123, audio/video encoder 124 of source device 120 may encode audio/video data 121, and transmitter/receiver unit 126 may transmit the encoded data over communication channel 150 to sink device 160. Transmitter/receiver unit 166 of sink device 160 receives the encoded data, and audio/video decoder 164 decodes the encoded data and outputs the decoded data via display 162 and speaker 163. In this manner, the audio and video data being rendered by display 122 and speaker 123 can be simultaneously rendered by display 162 and speaker 163. In some operating modes, display 122 and speaker 123 may be disabled during a communication session, such that wireless source device is transmitting audio and video data but not rendering the audio and video data locally. The audio data and video data may be arranged in frames, and the audio frames may be time-synchronized with the video frames when rendered. According to the techniques of this disclosure, the video payload data transmitted over communication channel 150 may include compressed or uncompressed pixel data, video component data with metadata, or some combination of both.

Audio/video encoder 124 and audio/video decoder 164 may implement any number of audio and video compression standards, such as the ITU-T H.264 standard, alternatively referred to as MPEG-4, Part 10, Advanced Video Coding (AVC), or the newly emerging high efficiency video coding (HEVC) standard, sometimes called the H.265 standard. Many other types of proprietary or standardized compression techniques may also be used. Generally speaking, audio/video decoder 164 is configured to perform the reciprocal coding operations of audio/video encoder 124. Although not shown in FIG. 1A, in some aspects, A/V encoder 124 and A/V decoder 164 may each be integrated with an audio encoder and decoder, and may include appropriate MUX-DEMUX units, or other hardware and software, to handle encoding of both audio and video in a common data stream or separate data streams.

As will be described in more detail below, A/V encoder 124 may also perform other encoding functions, in addition to implementing a video compression standard as described above. For example, A/V encoder 124 may add various types of metadata to A/V data 121 prior to A/V data 121 being transmitted to sink device 160. In some instances, A/V data 121 may be stored on or received at source device 120 in an encoded form and thus not require further compression by A/V encoder 124.

Additionally, when implementing techniques of this disclosure and operating in a video component mode, A/V encoder 124 may also intercept video component data prior to the video component data being converted to pixel data. A/V encoder 124 can add metadata to the video component data and transmit the metadata and video component data to wireless sink device 160 over communication channel 150. A/V decoder 164 of sink device 160 can generate pixel data based on the received video component data and metadata.

To operate in a video component mode, wireless source device 120 and wireless sink device 160 may have similar multimedia capabilities. The multimedia capabilities of wireless sink device 160 can be communicated to wireless source device 120 as part of a capability negotiation exchange that occurs when wireless source device 120 and wireless sink device 160 establish a communication session. During the capability negotiation exchange, wireless sink device 160 may provide to wireless source device 120 a list of supported graphics API types and versions, a list of supported application-specific instruction sets, a list of supported graphics textures, a list of supported CODECs, and other such capability information. Based on the received capability information, wireless source device 120 can determine if wireless sink device 160 possesses the multimedia capabilities needed to operate in a video component mode. Alternatively, wireless source device 120 may transmit to wireless sink device 160 a list of desired capabilities, and based on the list, wireless sink device 160 can determine if wireless sink device 160 possesses the capabilities needed to operate in a video component mode. In instances where wireless sink device 160 does not possess capabilities needed for operating in video component mode, wireless source device 120 may transmit pixel data, as opposed to video component data, to wireless sink device 160.

Although, FIG. 1A shows communication channel 150 carrying audio payload data and video payload data separately, in some instances, video payload data and audio payload data may be part of a common data stream. If applicable, MUX-DEMUX units may conform to the ITU H.223 multiplexer protocol, or other protocols such as the user datagram protocol (UDP). Audio/video encoder 124 and audio/video decoder 164 each may be implemented as one or more microprocessors, digital signal processors (DSPs), application specific integrated circuits (ASICs), field programmable gate arrays (FPGAs), discrete logic, software, hardware, firmware or any combinations thereof. Each of audio/video encoder 124 and audio/video decoder 164 may be included in one or more encoders or decoders, either of which may be integrated as part of a combined encoder/decoder (CODEC). Thus, each of source device 120 and sink device 160 may comprise specialized machines configured to execute one or more of the techniques of this disclosure.

Display 122 and display 162 may comprise any of a variety of video output devices such as a cathode ray tube (CRT), a liquid crystal display (LCD), a plasma display, a light emitting diode (LED) display, an organic light emitting diode (OLED) display, or another type of display device. In these or other examples, the displays 122 and 162 may each be emissive displays or transmissive displays. Display 122 and display 162 may also comprise touch displays such that they are simultaneously both input devices and display devices. Such touch displays may be capacitive, resistive, or other type of touch panel that allows a user to provide user input to the respective device.

Speaker 123 may comprise any of a variety of audio output devices such as headphones, a single-speaker system, a multi-speaker system, or a surround sound system. Additionally, although display 122 and speaker 123 are shown as part of source device 120 and display 162 and speaker 163 are shown as part of sink device 160, source device 120 and sink device 160 may in fact be a system of devices. As one example, display 162 may be a television, speaker 163 may be a surround sound system, and decoder 164 may be part of an external box connected, either wired or wirelessly, to display 162 and speaker 163. In other instances, sink device 160 may be a single device, such as a tablet computer or smartphone. In still other cases, source device 120 and sink device 160 may comprise similar devices, e.g., both being smartphones, tablet computers, or the like. In this case, one device may operate as the source and the other may operate as the sink. These rolls may even be reversed in subsequent communication sessions. In still other cases, the source device may comprise a mobile device, such as a smartphone, laptop or tablet computer, and the sink device may comprise a more stationary device (e.g., a video display projector with an AC power cord), in which case the source device may deliver audio and video data for presentation to a large crowd via the sink device.

Transmitter/receiver unit 126 and transmitter/receiver unit 166 may each include various mixers, filters, amplifiers and other components designed for signal modulation, as well as one or more antennas and other components designed for transmitting and receiving data. Communication channel 150 generally represents any suitable communication medium, or collection of different communication media, for transmitting video data from source device 120 to sink device 160. Communication channel 150 is usually a relatively short-range communication channel, similar to Wi-Fi, Bluetooth, or the like. However, communication channel 150 is not necessarily limited in this respect, and may comprise any wireless or wired communication medium, such as a radio frequency (RF) spectrum or one or more physical transmission lines, or any combination of wireless and wired media. In other examples, communication channel 150 may even form part of a packet-based network, such as a wired or wireless local area network, a wide-area network, or a global network such as the Internet. Additionally, communication channel 150 may be used by source device 120 and sink device 160 to create a peer-to-peer link. Source device 120 and sink device 160 may communicate over communication channel 150 using a communications protocol such as a standard from the IEEE 802.11 family of standards. Source device 120 and sink device 160 may, for example, communicate according to the Wi-Fi Direct standard, such that source device 120 and sink device 160 communicate directly with one another without the use of an intermediary such as a wireless access points or so called hotspot. Source device 120 and sink device 160 may also establish a tunneled direct link setup (TLDS) to avoid or reduce network congestion. The techniques of this disclosure may at times be described with respect to Wi-Fi, but it is contemplated that aspects of these techniques may also be compatible with other communication protocols. By way of example and not limitation, the wireless communication between source device 120 and sink device may utilize orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA. WiFi Direct and TDLS are intended to setup relatively short-distance communication sessions. Relatively short distance in this context may refer to, for example, less than approximately 70 meters, although in a noisy or obstructed environment the distance between devices may be even shorter, such as less than approximately 35 meters, less than approximately 20 meters, or even less than approximately 10 meters.

In addition to decoding and rendering data received from source device 120, sink device 160 can also receive user inputs from user input device 167. User input device 167 may, for example, be a keyboard, mouse, trackball or track pad, touch screen, voice command recognition module, or any other such user input device. UIPM 168 formats user input commands received by user input device 167 into a data packet structure that source device 120 is capable of interpreting. Such data packets are transmitted by transmitter/receiver 166 to source device 120 over communication channel 150. Transmitter/receiver unit 126 receives the data packets, and A/V control module 125 parses the data packets to interpret the user input command that was received by user input device 167. Based on the command received in the data packet, A/V control module 125 can change the content being encoded and transmitted. In this manner, a user of sink device 160 can control the audio payload data and video payload data being transmitted by source device 120 remotely and without directly interacting with source device 120. Examples of the types of commands a user of sink device 160 may transmit to source device 120 include commands for rewinding, fast forwarding, pausing, and playing audio and video data, as well as commands for zooming, rotating, scrolling, and so on. Users may also make selections, from a menu of options for example, and transmit the selection back to source device 120.

Additionally, users of sink device 160 may be able to launch and control applications on source device 120. For example, a user of sink device 160 may able to launch a photo editing application stored on source device 120 and use the application to edit a photo that is stored locally on source device 120. Sink device 160 may present a user with a user experience that looks and feels like the photo is being edited locally on sink device 160 while in fact the photo is being edited on source device 120. Using such a configuration, a device user may be able to leverage the capabilities of one device for use with several devices. For example, source device 120 may be a smartphone with a large amount of memory and high-end processing capabilities. A user of source device 120 may use the smartphone in all the settings and situations smartphones are typically used. When watching a movie, however, the user may wish to watch the movie on a device with a bigger display screen, in which case sink device 160 may be a tablet computer or even larger display device or television. When wanting to send or respond to email, the user may wish to use a device with a keyboard, in which case sink device 160 may be a laptop. In both instances, the bulk of the processing may still be performed by source device 120 (a smartphone in this example) even though the user is interacting with a sink device. In this particular operating context, due to the bulk of the processing being performed by source device 120, sink device 160 may be a lower cost device with fewer resources than if sink device 160 were used to handle the processing being done by source device 120. Both the source device and the sink device may be capable of receiving user input (such as touch screen commands) in some examples, and the techniques of this disclosure may facilitate two-way interaction by negotiating and or identifying the capabilities of the devices in any given session.

In some configurations, A/V control module 125 perform an operating system process executed by the operating system of source device 125. In other configurations, however, A/V control module 125 may comprise a software process of an application running on source device 120. In such a configuration, the user input command may be interpreted by the software process, such that a user of sink device 160 is interacting directly with the application running on source device 120, as opposed to the operating system running on source device 120. By interacting directly with an application as opposed to an operating system, a user of sink device 160 may have access to a library of commands that are not native to the operating system of source device 120. Additionally, interacting directly with an application may enable commands to be more easily transmitted and processed by devices running on different platforms.

Source device 120 can respond to user inputs applied at wireless sink device 160. In such an interactive application setting, the user inputs applied at wireless sink device 160 may be sent back to the wireless display source over communication channel 150. In one example, a reverse channel architecture, also referred to as a user interface back channel (UIBC) may be implemented to enable sink device 160 to transmit the user inputs applied at sink device 160 to source device 120. The reverse channel architecture may include upper layer messages for transporting user inputs and lower layer frames for negotiating user interface capabilities at sink device 160 and source device 120. The UIBC may reside over the Internet Protocol (IP) transport layer between sink device 160 and source device 120. In this manner, the UIBC may be above the transport layer in the Open System Interconnection (OSI) communication model. In one example, the OSI communication includes seven layers (1—physical, 2—data link, 3—network, 4—transport, 5—session, 6—presentation, and 7—application). In this example, being above transport layer refers to layers 5, 6, and 7. To promote reliable transmission and in sequence delivery of data packets containing user input data, UIBC may be configured run on top of other packet-based communication protocols such as the transmission control protocol/internet protocol (TCP/IP) or the user datagram protocol (UDP). UDP and TCP can operate in parallel in the OSI layer architecture. TCP/IP can enable sink device 160 and source device 120 to implement retransmission techniques in the event of packet loss.

In some cases, there may be a mismatch between the user displays located at source device 120 and sink device 160. To resolve the potential problems created by such a mismatch and to promote a good user experience under such circumstances, as part of a capability negotiation exchange between source device 120 and sink device 160, source device 120 and sink device 160 can agree on a negotiated screen resolution. When sink device 160 transmits coordinate data associated with a user input, sink device 160 can scale coordinate data obtained from display 162 to match the negotiated screen resolution. Similarly, when wireless source device 120 transmits video component data with a particular resolution identified in the metadata to wireless sink device 160, wireless source device 120 can scale the resolution included in the metadata to match the negotiated resolution. In one example, if sink device 160 has a 1280× 720 resolution and source device 120 has a 1600×900 resolution, the devices may, for example, use a 1280×720 resolution as their negotiated resolution. The negotiated resolution may be chosen based on a resolution of sink device 160, although a resolution of source device 120 or some other resolution may also be used. In the example where the sink device of a 1280×720 resolution is used, sink device 160 can scale obtained x-coordinates by a factor of 1600/1280 prior to transmitting the coordinates to source device 120, and likewise, sink device 160 can scale obtained y-coordinates by 900/720 prior to transmitting the coordinates to source device 120. In other configurations, source device 120 can scale the obtained coordinates to the negotiated resolution. The scaling may either increase or decrease a coordinate range based on whether sink device 160 uses a higher resolution display than source device 120, or vice versa.

Additionally, in some instances, the resolution at sink device 160 may vary during a communication session, potentially creating a mismatch between display 122 and display 162. In order to improve the user experience and to ensure proper functionality, source/sink system 100 may implement techniques for reducing or preventing user interaction mismatch by implementing techniques for screen normalization. Display 122 of source device 120 and display 162 of sink device 160 may have different resolutions and/or different aspects ratios. Additionally, in some settings, a user of sink device 160 may have the ability to resize a display window for the video data received from source device 120 such that the video data received from source device 120 is rendered in a window that covers less than all of display 162 of sink device 160. In another example setting, a user of sink device 160 may have the option of viewing content in either a landscape mode or a portrait mode, each of which has unique coordinates and different aspect ratios. In such situations, coordinates associated with a user input received at sink device 160, such as the coordinate for where a mouse click or touch event occurs, may not able to be processed by source device 120 without modification to the coordinates. Accordingly, techniques of this disclosure may include mapping the coordinates of the user input received at sink device 160 to coordinates associated with source device 120. This mapping is also referred to as normalization herein, and as will be explained in greater detail below, this mapping can be either sink-based or source-based.

User inputs received by sink device 160 can be received by UI module 167, at the driver level for example, and passed to the operating system of sink device 160. The operating system on sink device 160 can receive coordinates ($x_{SINK}$, $y_{SINK}$) associated with where on a display surface a user input occurred. In this example, ($x_{SINK}$, $y_{SINK}$) can be coordinates of display 162 where a mouse click or a touch event occurred. The display window being rendered on display 162 can have an x-coordinate length ($L_{DW}$) and a y-coordinate width ($W_{DW}$) that describe the size of the display window. The display window may also have an upper left corner coordinate ($a_{DW}$, $b_{DW}$) that describes the location of the display window. Based on $L_{DW}$, $W_{DW}$, and the upper left coordinate ($a_{DW}$, $b_{DW}$), the portion of display 162 covered by the display window can be determined. For example, an upper right corner of the display window can be located at coordinate ($a_{DW}+L_{DW}$, $b_{DW}$), a lower left corner of the display window can be located at coordinate ($a_{DW}$, $b_{DW}+W_{DW}$), and a lower right corner of the display window can be located at coordinate ($a_{DW}+L_{DW}$, $b_{DW}+W_{DW}$). Sink device 160 can process an input as a UIBC input if the input is received at a coordinate within the display window. In other words, an input with associated coordinates ($x_{SINK}$, $y_{SINK}$) can be processed as a UIBC input if the following conditions are met:

$$a_{DW} \leq x_{SINK} \leq a_{DW}+L_{DW} \quad (1)$$

$$b_{DW} \leq y_{SINK} \leq b_{DW}+W_{DW} \quad (2)$$

After determining that a user input is a UIBC input, coordinates associated with the input can be normalized by UIPM 168 prior to being transmitted to source device 120. Inputs that are determined to be outside the display window can be processed locally by sink device 160 as non-UIBC inputs.

As mentioned above, the normalization of input coordinates can be either sourced-based or sink-based. When implementing sink-based normalization, source device 120 can send a supported display resolution ($L_{SRC}$, $W_{SRC}$) for display 122, either with video data or independently of video data, to sink device 160. The supported display resolution may, for example, be transmitted as part of a capability negotiation session or may be transmitted at another time during a communication session. Sink device 160 can determine a display resolution ($L_{SINK}$, $W_{SINK}$) for display 162, the display window resolution ($L_{DW}$, $W_{DW}$) for the window displaying the content received from source device 120, and the upper left corner coordinate ($a_{DW}$, $b_{DW}$) for the display window. As described above, when a coordinate ($x_{SINK}$, $y_{SINK}$) corresponding to a user input is determined to be within the display window, the operating system of sink device 160 can map the coordinate ($x_{SINK}$, $y_{SINK}$) to source coordinates ($x_{SRC}$, $y_{SRC}$) using conversion functions. Example conversion functions for converting ($x_{SINK}$, $y_{SINK}$) to ($x_{SRC}$, $y_{SRC}$) can be as follows:

$$x_{SRC}=(x_{SINK}-a_{DW})*(L_{SRC}/L_{DW}) \quad (3)$$

$$y_{SRC}=(y_{SINK}-b_{DW})*(W_{SRC}/W_{DW}) \quad (4)$$

Thus, when transmitting a coordinate corresponding to a received user input, sink device 160 may transmit the coordinate ($x_{SRC}$, $y_{SRC}$) for a user input received at ($x_{SINK}$, $y_{SINK}$). As will be described in more detail below, coordinate ($x_{SRC}$, $y_{SRC}$) may, for example, be transmitted as part of a data packet used for transmitting user input received at sink device 160 to source device 120 over the UIBC. Throughout other portions of this disclosure, where input coordinates are described as being included in a data packet, those coordinates may be converted to source coordinates as described above in instances where source/sink system 100 implements sink-based normalization.

When source/sink system 100 implements sourced-based normalization, for user inputs determined to by UIBC inputs as opposed to local inputs (i.e. within a display window as opposed to outside a display window), the calculations above can be performed at source device 120 instead of sink device 160. To facilitate such calculations, sink device 160 may transmit to source device 120 values for $L_{DW}$, $W_{DW}$, and location information for the display window (e.g. $a_{DW}$, $b_{DW}$), as well as coordinates for ($x_{SINK}$, $y_{SINK}$). Using these transmitted values, source device 120 can determine values for ($x_{SRC}$, $y_{SRC}$) according to equations 3 and 4 above.

In other implementations of sink-based normalization, sink device 160 may transmit coordinates ($x_{DW}$, $y_{DW}$) for a user input that describe where within the display window a user input event occurs as opposed to where on display 162 the user input even occurs. In such an implementation, coordinates ($x_{DW}$, $y_{DW}$) can be transmitted to source device 120 along with values for ($L_{DW}$, $W_{DW}$). Based on these received values, source device 120 can determine ($x_{SRC}$, $y_{SRC}$) according to the following conversion functions:

$$x_{SRC}=x_{DW}*(L_{SRC}/L_{DW}) \quad (5)$$

$$y_{SRC}=y_{DW}*(W_{SRC}/W_{DW}) \quad (6)$$

Sink device 160 can determine $x_{DW}$ and $y_{DW}$ based on the following functions:

$$x_{DW}=x_{SINK}-a_{DW} \quad (7)$$

$$y_{DW}=y_{SINK}-b_{DW} \quad (8)$$

When this disclosure describes transmitting coordinates associated with a user input, in a data packet for example, the transmission of these coordinates may include sink-based or source-based normalization as described above, and/or may include any additional information desirable for performing the sink-based or source-based normalization.

The UIBC may be designed to transport various types of user input data, including cross-platform user input data. For example, source device 120 may run the iOS® operating system, while sink device 160 runs another operating system such as Android® or Windows®. Regardless of platform, UIPM 168 may encapsulate received user input in a form understandable to A/V control module 125. A number of different types of user input formats may be supported by the UIBC so as to allow many different types of source and sink devices to exploit the protocol regardless of whether the source and sink devices operate on different platforms. Generic input formats may be defined, and platform specific input formats may both be supported, thus providing flexibility in the manner in which user input can be communicated between source device 120 and sink device 160 by the UIBC.

In the example of FIG. 1A, source device 120 may comprise a smartphone, tablet computer, laptop computer, desktop computer, Wi-Fi enabled television, or any other device capable of transmitting audio and video data. Sink device 160 may likewise comprise a smartphone, tablet computer, laptop computer, desktop computer, Wi-Fi enabled television, or any other device capable of receiving audio and video data and receiving user input data. In some instances, sink device 160 may include a system of devices, such that display 162, speaker 163, UI device 167, and A/V encoder 164 all parts of separate but interoperative devices. Source device 120 may likewise be a system of devices rather than a single device.

In this disclosure, the term source device is generally used to refer to the device that is transmitting audio/video data, and the term sink device is generally used to refer to the device that is receiving the audio/video data from the source device. In many cases, source device 120 and sink device 160 may be similar or identical devices, with one device operating as the source and the other operating as the sink. Moreover, these rolls may be reversed in different communication sessions. Thus, a sink device in one communication session may become a source device in a subsequent communication session, or vice versa.

Figure 1B:
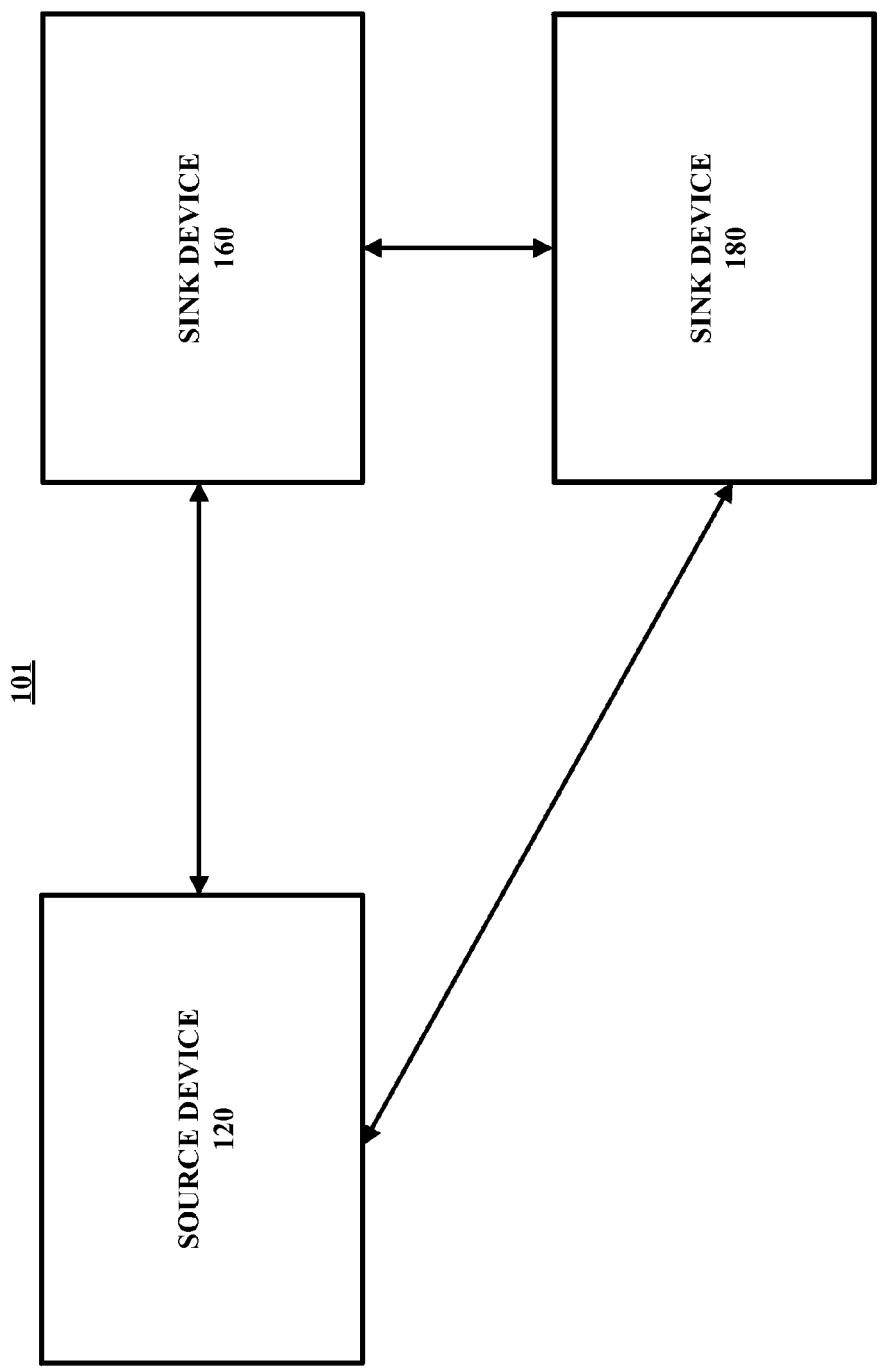
FIG. 1B is a block diagram illustrating an example of a source/sink system with two sink devices.

FIG. 1B is a block diagram illustrating an exemplary source/sink system 101 that may implement techniques of this disclosure. Source/sink system 101 includes source device 120 and sink device 160, each of which may function and operate in the manner described above for FIG. 1A. Source/sink system 101 further includes sink device 180. In a similar manner to sink device 160 described above, sink device 180 may receive audio and video data from source device 120 and transmit user commands to source device 120 over an established UIBC. In some configurations, sink device 160 and sink device 180 may operate independently of one another, and audio and video data output at source device 120 may be simultaneously output at sink device 160 and sink device 180. In alternate configurations, sink device 160 may be a primary sink device and sink device 180 may be a secondary sink device. In such an example configuration, sink device 160 and sink device 180 may be coupled, and sink device 160 may display video data while sink device 180 outputs corresponding audio data. Additionally, in some configurations, sink device 160 may output transmitted video data only while sink device 180 outputs transmitted audio data only.

Figure 2A:
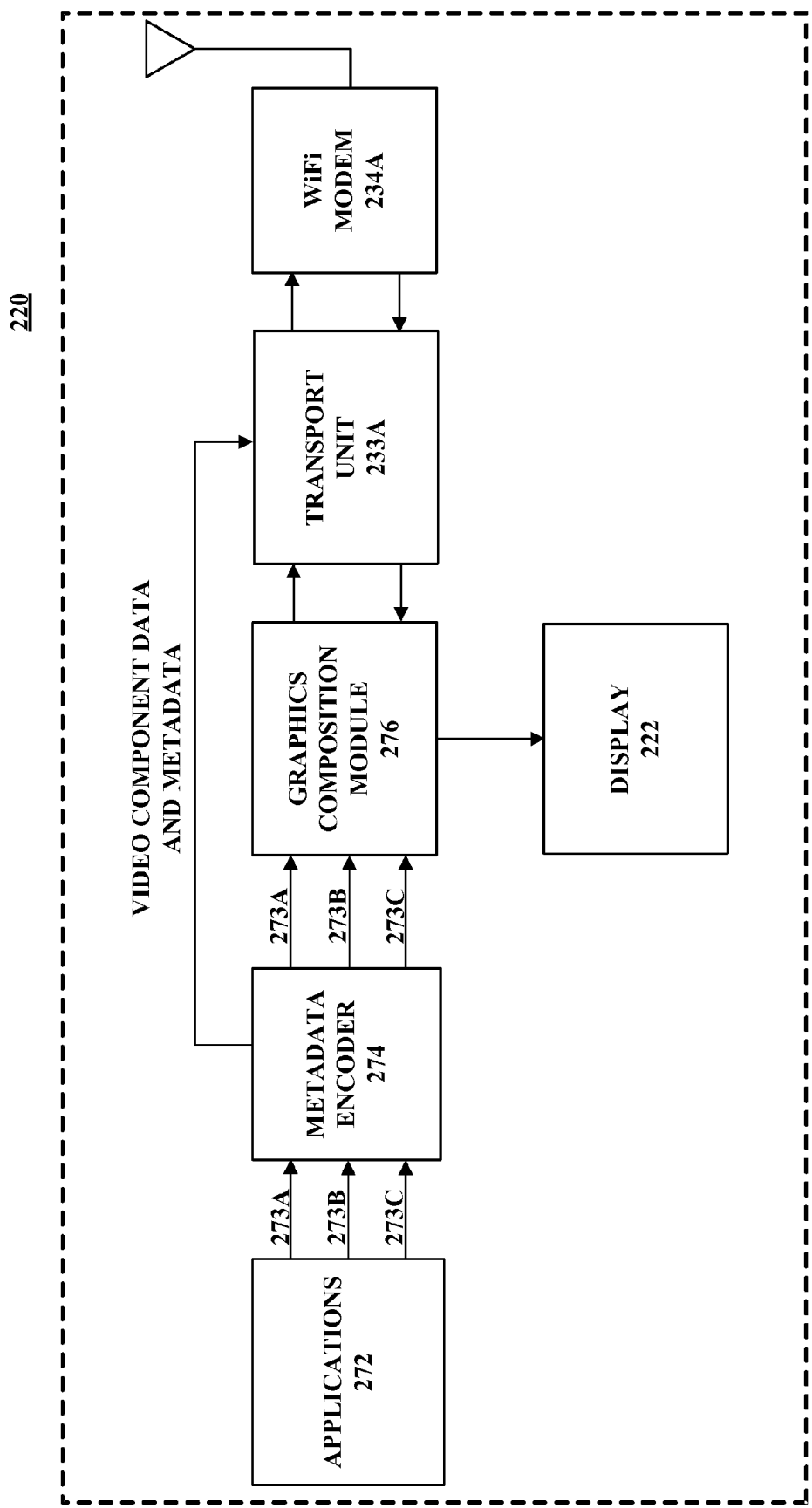
FIGS. 2A and 2B is a block diagram illustrating an example of a source/sink system that may implement techniques of this disclosure.
Figure 2B:
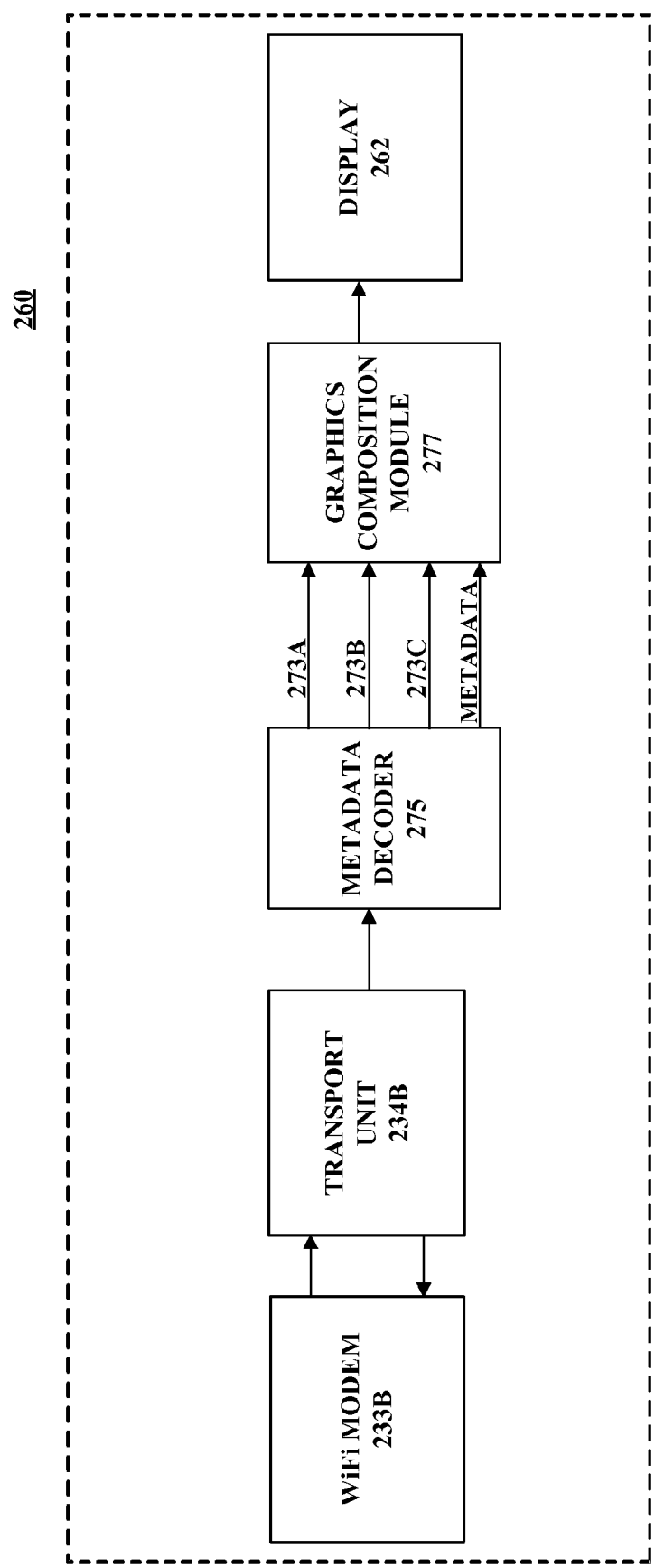

FIGS. 2A and 2B are block diagrams illustrating an example of a source/sink system that may implement techniques of this disclosure. The source/sink system of FIGS. 2A and 2B includes source device 220 shown in FIG. 2A and sink device 260 shown in FIG. 2B. Source device 220 and sink device 260 generally operate in the same manner as source device 120 and sink device 160 of FIG. 1A, but FIGS. 2A and 2B emphasize different components of the devices. Source device 220 includes applications 272, metadata encoder 274, graphics composition module 276, local display 222, transport unit 233A and WiFi Modem 234A. Sink device 260 includes WiFi Modem 233B, transport unit 234B, metadata decoder 275, graphics composition module 277, and display 262.

Source device 220 may run one or more user applications (applications 272) that generate video component data, such as video component data 273A, 273B, and 273C shown on FIG. 2A. As will be explained in more detail below, metadata encoder 274 may intercept video component data 273A-C prior to rendering by graphics composition module 276 and add metadata to video component data 273A-C. Transport unit 233A may encapsulate the video component data 273A-C and the metadata and transmit it to wireless sink device 260 using WiFi modem 234A.

Video component data 273A-C may also be processed by wireless source device 220 to generate pixel data. Graphics composition module 276 can render pixel data based on video component data 273A-C for local display by display 222. In this manner, graphics composition module 276 is generally intended to represent all the graphics rendering resources available to source device 220, which may include, for example, hardware components such as general purpose processors and graphics processors and which may also include software components such as supported APIs, graphics applications, graphics drivers, video CODECs, and so on.

When operating in a video component mode, metadata encoder 274 may intercept video components 273A-C prior to rendering by graphics composition module and generate metadata associated with the video component data. Video components 273A-C may represent, for example, calls to a graphics API, such as OpenGL commands or Microsoft DirectX commands, compressed video encoded by an encoding standard such as H.264 or the newly emerging HEVC standard, images generated by an operating system or application, compressed or uncompressed audio data, or other such data. In some example, one or more of video components 273A-C may also be pixel data, but not necessarily a full frame of pixel data. For example, one of the video components may be pixel data corresponding to an icon to be overlaid compressed video. Although, FIGS. 2A and 2B show three video components (273A-C), it is contemplated that fewer than three, including possibly only one, video component may be used in some situations. Similarly, it is also contemplated that more than three video components may also be used. Additionally, in this disclosure, video data components 273A-C are each intended to represent a different type of video component data, but are not necessarily intended to represent only one component of each type. For example, video component 273A might represent a plurality of OpenGL commands, video component 273C might represent a plurality of pixel data icons, and so on.

As one example of how video component data might be intercepted, applications 272 may issue a command to a driver of a GPU instructing the GPU to draw one or more primitives for 3D graphics. This draw command may, for example, be an OpenGL glDraw command, such as glDrawArrays or glDrawElements. When applications 272 issue the glDraw command, metadata encoder 274 can intercept the draw command and transmit the draw command to wireless sink device 260 with metadata. Other graphics commands, such as texture commands, may similarly be intercepted. Commands for other graphics APIs can be similarly intercepted.

As another example of how video component data might be intercepted, metadata encoder 274 may monitor applications 272 to detect if applications 272 initialize a video CODEC. Upon initialization of a video CODEC, metadata encoder 274 can identify data as compressed video data. As another example, when a media player application is launched to play a video clip on source device 220, a media parser component may be initialized with other components to construct a playback pipeline. Metadata encoder 274 may implement a stub in the parser component to detect its initialization, and intercept the video component data. In yet another example, a stub can be inserted into a composition engine on wireless source 220. The stub can be used to detect the data flow and intercept the video component data, as needed.

Metadata encoder 274 can generate metadata describing how the video component data should be assembled to render a frame for display by the wireless sink device. The metadata may, for example, include data identifying screen locations for video components 273A-C, as well as data enabling one or more of video components 273A-C to be synced to audio data. The metadata may identify a screen location by including the coordinates of a top-left point or other point for a window or other such location of a portion of the image data produced from the video component. The metadata may also include resolution data identify the resolution of the source device. Screen coordinate data and resolution data included in the metadata may be scaled by either the sink device or the source device in the manner described above.

The metadata may, for example, also indicate if image data produced by one video component should be in front of or behind (i.e. on top of or in back of) image data produced by another video component, and may also include color blending information for overlapping components or depth information for 3D graphics content.

Additionally, the metadata generated by metadata encoder 274 may include a frame identifier, such as a timestamp, used to identify a frame. The frame identifier may, for example, be used by wireless sink device 260 to assemble video component data 273A-C as part of the correct frame, and may also be used by wireless source device 220 to determine which frame a particular user input is associated with. For example, wireless source device 220 may include in the metadata associated with video component data a timestamp. When sink device 260 receives a user input, sink device 260 may identify the timestamp associated with frame being displayed when the user input was received and transmit the timestamp bask to wireless source device 220, so that source device 220 can process the user input in view of the frame being displayed by sink device 260 when the user input was received at wireless sink device 260.

Transport unit 233A can encapsulate video component data and metadata, and WiFi modem 234A can transmit the encapsulated to sink device 260. WiFi modem 234B can receive the encapsulated data, and transport unit 233B can decapsulate the encapsulated data. The functionality of transport unit 233A and WiFi modem 234A is generally similar to the functionality of transport unit 333 and WiFi modem 334, described in more detail below with reference to FIG. 3. Similarly, the functionality of transport unit 234B and WiFi modem 234B is generally similar to the functionality of transport unit 433 and WiFi modem 434, described in more detail below with reference to FIG. 4.

Metadata decoder 275 can be configured to extract from the decapsulated data the video component data (video component data 273A-C in this example) and the metadata generated by metadata encoder 274. Graphics composition module 277 can render pixel data based on video component data 273A-C for display on display 262. In this manner, graphics composition module 277 is generally intended to represent all the graphics rendering resources and capabilities available to sink device 260, which may include, for example, hardware components such as general purpose processors and graphics processors and which may also include software components such as supported APIs, graphics applications, graphics drivers, video CODECs, and so on. In some implementations, the capabilities of graphics composition module 276 of source device 220 and graphics composition module 277 of sink device 260 may be selected such that graphics composition module 276 and graphics composition module 277 share at least some similar capabilities, thus enabling graphics composition module 277 to render the video component data transmitted from wireless source device 220.

As previously explained, according to techniques of this disclosure, wireless source device 220 can be configured to transmit video component data and metadata to wireless sink device 260. Based on the component video data and metadata, wireless sink device 260 may generate pixel data as part of rendering the video data provided by wireless source device 220. Transmitting video component data and metadata rather than pixel data may, in some instances, reduce the overall amount of data needed to be transmitted from source device 220 to sink device 260. Wireless source device 220 may still generate pixel data for local display on display 222, but the pixel data does not necessarily need to be transmitted to wireless sink device 260. Additionally, in some implementations, wireless source device 220 and wireless sink device 260 may support multiple modes of operation, where, for example, in a pixel mode, wireless source device 220 transmits pixel data, but in a video component mode, wireless source device 260 transmits component video data. In the video component mode, wireless source device 220 may also transmit pixel data in addition to the video component data and the metadata described above.

Wireless sink device 260 can receive the video component data and the metadata, and based on the metadata, assemble the video component data into a frame for display. In one example, video component data 279B may be compressed video data that is coded using the H.264 coding standard. Wireless sink device 260 can decode the encoded video data to render a frame for display. For example, graphics composition module 277 may include an H.264 video decoder. In this manner, wireless sink device 260 and wireless source device 220 may possess many or some the same video processing capabilities. For example, if the wireless source device 220 implements an H.264 codec, then wireless sink device 260 may also implement an H.264 codec.

In another example, wireless source device 220 may transmit to wireless sink device two video data components (e.g. 273A and 273B), where video component 273B corresponds to a movie or television show in an encoded format, and video component 273A corresponds to media player user interface elements rendered by an application of wireless source device 220. The user interface elements may, for example, comprise onscreen controls such as play, pause, stop, etc. indicating where a user should touch to control playback of the movie or TV show of video component 273B. Wireless source device 220 can intercept video component data 273A and 273B, generate metadata describing video components 273A and 273B, and transmit video components 273A and 273B to wireless sink device 260. The metadata may, for example, indicate screen resolution information so that wireless sink device 260 can scale video components 273A and 273B appropriately, include synchronization information so that the user interface elements of video component 273A can be applied to the correct frame of video data of video component 273B, include location information indicating where the user interface elements are to be located and that they should be on top of the video of video component 273B, and include other such information. Based on the metadata, graphics composition module 227 can render a frame of video with the user interface elements of video component 273A on top of the video produced by video component 273B.

Figure 3:
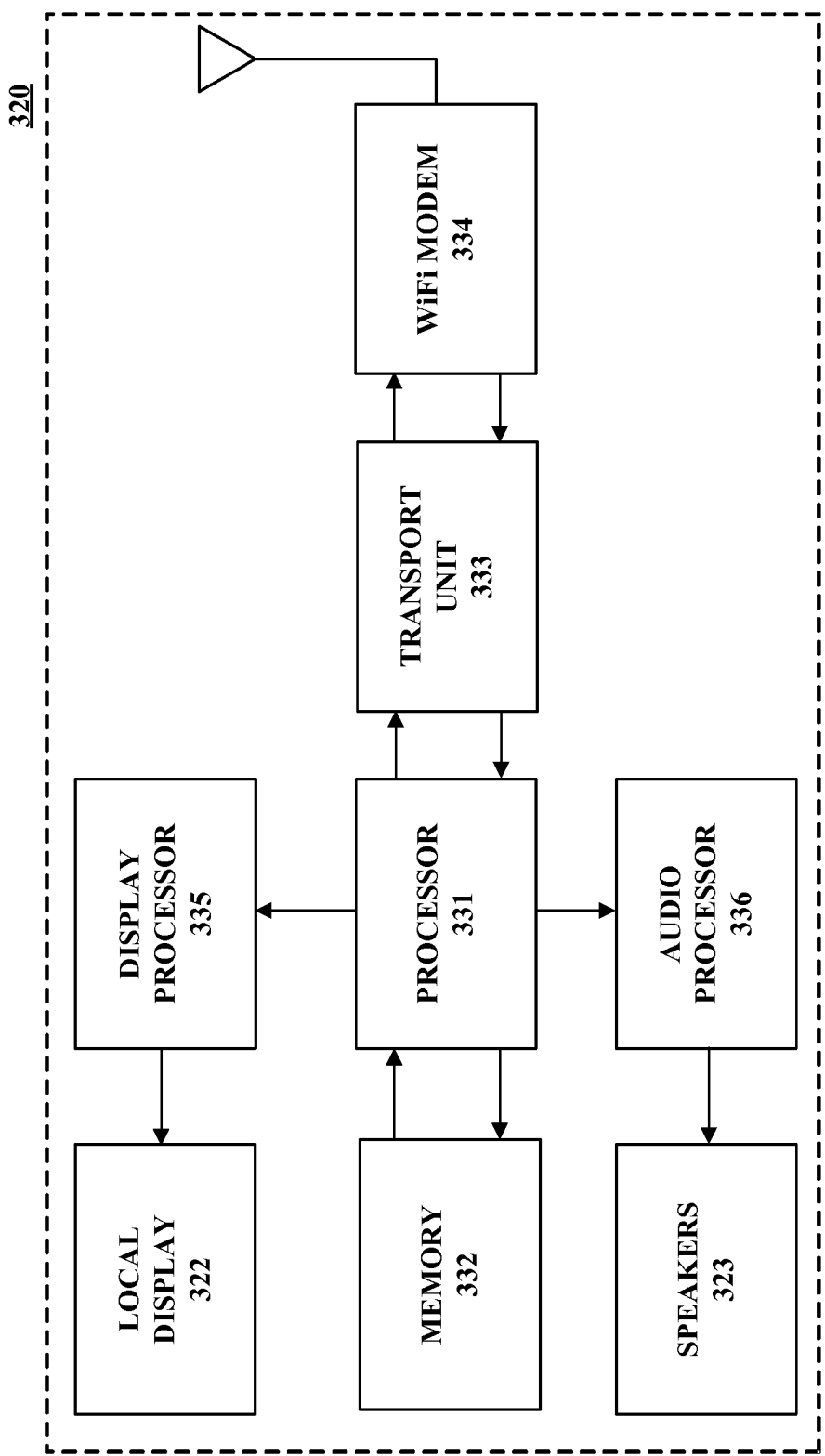
FIG. 3 is a block diagram showing an example of a source device that may implement techniques of this disclosure.

FIG. 3 is a block diagram showing one example of a source device 320. Source device 320 may be a device similar to source device 120 in FIG. 1A and source device 220 in FIG. 2A and may operate in the same manners described above. Source device 320 includes local display 322, local speaker 323, processors 331, memory 332, transport unit 333, and wireless modem 334. As shown in FIG. 3, source device 320 may include one or more processors (i.e. processor 331) that encode and/or decode A/V data for transport, storage, and display. The A/V data may for example be stored at memory 332. Memory 332 may store an entire A/V file, or may comprise a smaller buffer that simply stores a portion of an A/V file, e.g., streamed from another device or source. Transport unit 333 may process encoded A/V data for network transport. For example, encoded A/V data may be processed by processor 331 and encapsulated by transport unit 333 into Network Access Layer (NAL) units for communication across a network. The NAL units may be sent by wireless modem 334 to a wireless sink device via a network connection. Wireless modem 334 may, for example, be a Wi-Fi modem configured to implement one of the IEEE 802.11 family of standards.

Source device 320 may also locally process and display A/V data. In particular display processor 335 may process video data to be displayed on local display 322, audio processor 336 may process audio data for output on speaker 323.

As described above with reference to source device 120 of FIG. 1A, source device 320 may also receive user input commands from a sink device. In this manner, wireless modem 334 of source device 320 receives encapsulated data packets, such as NAL units, and sends the encapsulated data units to transport unit 333 for decapsulation. For instance, transport unit 333 may extract data packets from the NAL units, and processor 331 can parse the data packets to extract the user input commands. Based on the user input commands, processor 331 can adjust the encoded A/V data being transmitted by source device 320 to a sink device. In this manner, the functionality described above in reference to A/V control module 125 of FIG. 1A may be implemented, either fully or partially, by processor 331.

Processor 331 of FIG. 3 generally represents any of a wide variety of processors, including but not limited to one or more digital signal processors (DSPs), general purpose microprocessors, application specific integrated circuits (ASICs), field programmable logic arrays (FPGAs), other equivalent integrated or discrete logic circuitry, or some combination thereof. Processor 331 may represent a set of processors that, for example, includes both a central processing unit and one or more application-specific instruction-set processor (ASIP) tailored for specific applications. Memory 332 of FIG. 3 may comprise any of a wide variety of volatile or non-volatile memory, including but not limited to random access memory (RAM) such as synchronous dynamic random access memory (SDRAM), read-only memory (ROM), non-volatile random access memory (NVRAM), electrically erasable programmable read-only memory (EEPROM), FLASH memory, and the like, Memory 332 may comprise a computer-readable storage medium for storing audio/video data, as well as other kinds of data. Memory 332 may additionally store instructions and program code that are executed by processor 331 as part of performing the various techniques described in this disclosure.

Figure 4:
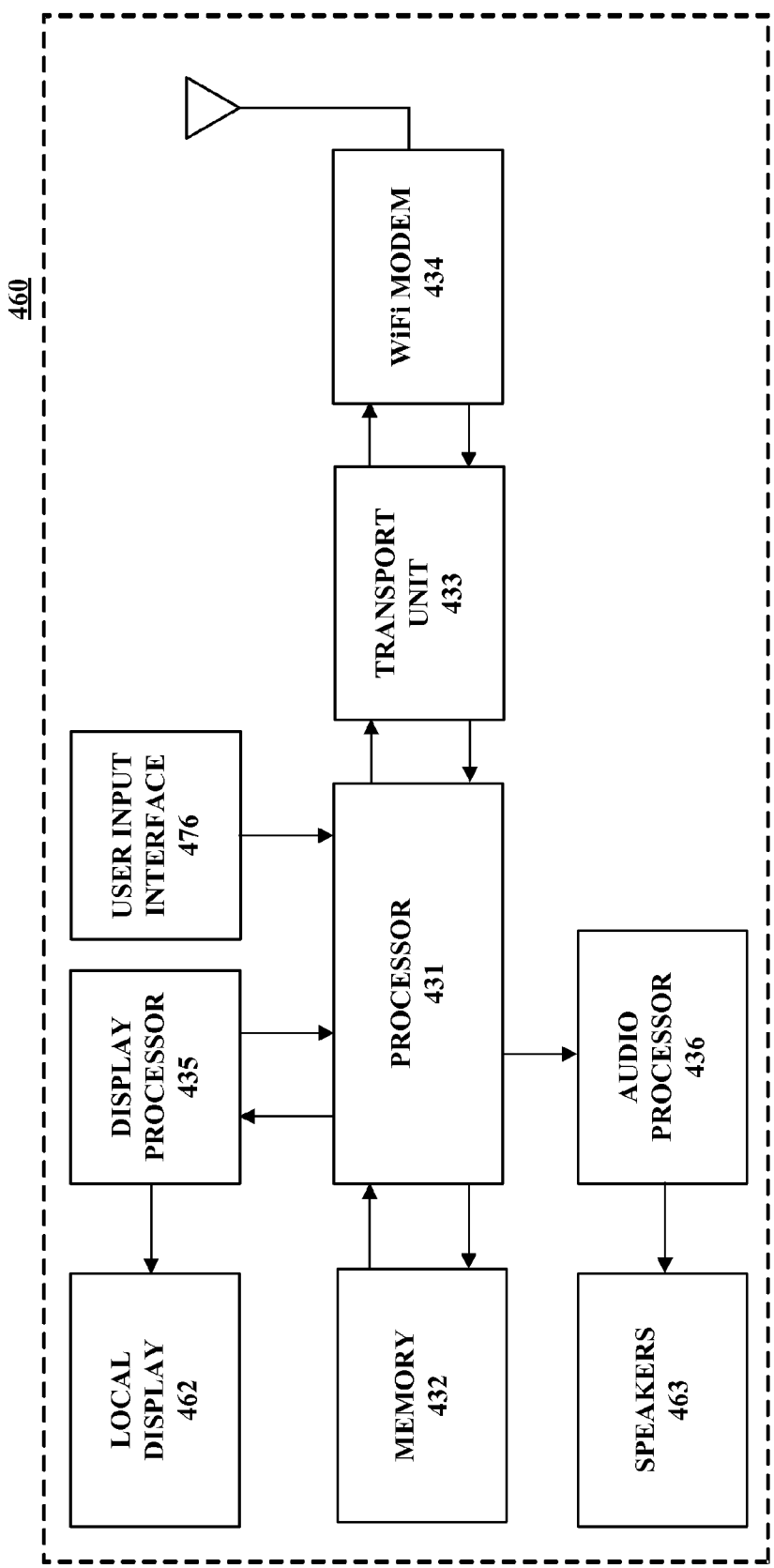
FIG. 4 is a block diagram showing an example of a sink device that may implement techniques of this disclosure.

FIG. 4 shows an example of a sink device 460. Sink device 460 may be a device similar to sink device 160 in FIG. 1A and sink device 260 in FIG. 2B and may operate in the same manners described above. Sink device 460 includes one or more processors (i.e. processor 431), memory 432, transport unit 433, wireless modem 434, display processor 435, local display 462, audio processor 436, speaker 463, and user input interface 476. Sink device 460 receives at wireless modem 434 encapsulated data units sent from a source device. Wireless modem 434 may, for example, be a Wi-Fi modem configured to implement one more standards from the IEEE 802.11 family of standards. Transport unit 433 can decapsulate the encapsulated data units. For instance, transport unit 433 may extract encoded video data from the encapsulated data units and send the encoded A/V data to processor 431 to be decoded and rendered for output. Display processor 435 may process decoded video data to be displayed on local display 462, and audio processor 436 may process decoded audio data for output on speaker 463.

In addition to rendering audio and video data, wireless sink device 460 can also receive user input data through user input interface 476. User input interface 476 can represent any of a number of user input devices included but not limited to a touch display interface, a keyboard, a mouse, a voice command module, gesture capture device (e.g., with camera-based input capturing capabilities) or any other of a number of user input devices. User input received through user input interface 476 can be processed by processor 431. This processing may include generating data packets that include the received user input command in accordance with the techniques described in this disclosure. Once generated, transport unit 433 may process the data packets for network transport to a wireless source device over a UIBC.

Processor 431 of FIG. 4 may comprise one or more of a wide range of processors, such as one or more digital signal processors (DSPs), general purpose microprocessors, application specific integrated circuits (ASICs), field programmable logic arrays (FPGAs), other equivalent integrated or discrete logic circuitry, or some combination thereof. Processor 431 may represent a set of processors that, for example, includes both a central processing unit and one or more application-specific instruction-set processor (ASIP) tailored for specific applications. Memory 432 of FIG. 4 may comprise any of a wide variety of volatile or nonvolatile memory, including but not limited to random access memory (RAM) such as synchronous dynamic random access memory (SDRAM), read-only memory (ROM), nonvolatile random access memory (NVRAM), electrically erasable programmable read-only memory (EEPROM), FLASH memory, and the like, Memory 232 may comprise a computer-readable storage medium for storing audio/video data, as well as other kinds of data. Memory 432 may additionally store instructions and program code that are executed by processor 431 as part of performing the various techniques described in this disclosure.

Figure 5:
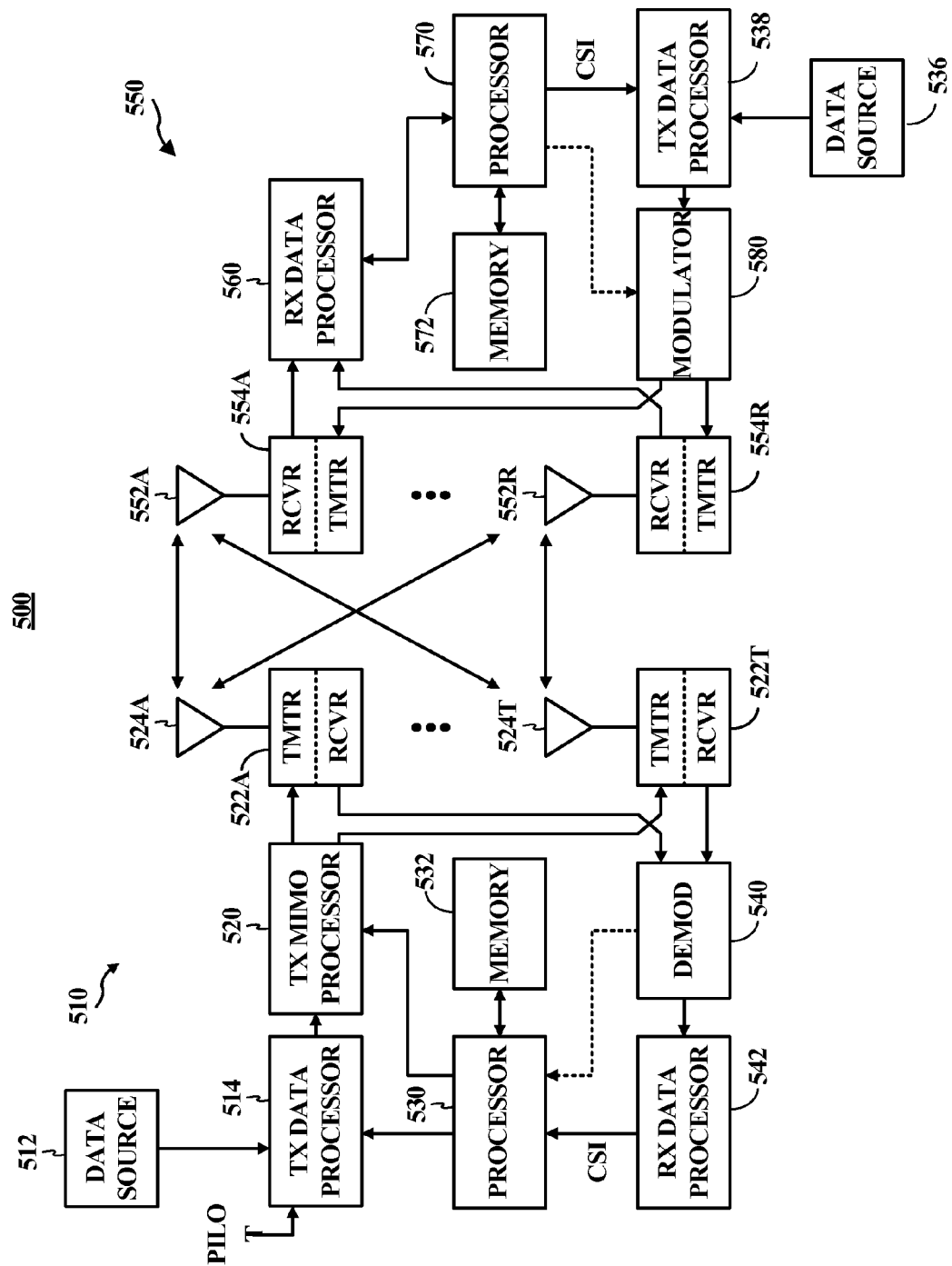
FIG. 5 is a block diagram of a transmitter system and a receiver system that may implement techniques of this disclosure.

FIG. 5 shows a block diagram of an example transmitter system 510 and receiver system 550, which may be used by transmitter/receiver 126 and transmitter/receiver 166 of FIG. 1A for communicating over communication channel 150. At transmitter system 510, traffic data for a number of data streams is provided from a data source 512 to a transmit (TX) data processor 514. Each data stream may be transmitted over a respective transmit antenna. TX data processor 514 formats, codes, and interleaves the traffic data for each data stream based on a particular coding scheme selected for that data stream.

The coded data for each data stream may be multiplexed with pilot data using orthogonal frequency division multiplexing (OFDM) techniques. A wide variety of other wireless communication techniques may also be used, including but not limited to time division multi access (TDMA), frequency division multi access (FDMA), code division multi access (CDMA), or any combination of OFDM, FDMA, TDMA and/or CDMA.

Consistent with FIG. 5, the pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK, or M-QAM (Quadrature Amplitude Modulation), where M may be a power of two) selected for that data stream to provide modulation symbols. The data rate, coding, and modulation for each data stream may be determined by instructions performed by processor 530 which may be coupled with memory 532.

The modulation symbols for the data streams are then provided to a TX MIMO processor 520, which may further process the modulation symbols (e.g., for OFDM). TX MIMO processor 520 can then provide $N_T$ modulation symbol streams to $N_T$ transmitters (TMTR) 522a through 522t. In certain aspects, TX MIMO processor 520 applies beamforming weights to the symbols of the data streams and to the antenna from which the symbol is being transmitted.

Each transmitter 522 may receive and process a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 522a through 522t are then transmitted from $N_T$ antennas 524a through 524t, respectively.

At receiver system 550, the transmitted modulated signals are received by $N_R$ antennas 552a through 552r and the received signal from each antenna 552 is provided to a respective receiver (RCVR) 554a through 554r. Receiver 554 conditions (e.g., filters, amplifies, and downconverts) a respective received signal, digitizes the conditioned signal to provide samples, and further processes the samples to provide a corresponding "received" symbol stream.

A receive (RX) data processor 560 then receives and processes the $N_R$ received symbol streams from $N_R$ receivers 554 based on a particular receiver processing technique to provide $N_T$ "detected" symbol streams. The RX data processor 560 then demodulates, deinterleaves and decodes each detected symbol stream to recover the traffic data for the data stream. The processing by RX data processor 560 is complementary to that performed by TX MIMO processor 520 and TX data processor 514 at transmitter system 510.

A processor 570 that may be coupled with a memory 572 periodically determines which pre-coding matrix to use. The reverse link message may comprise various types of information regarding the communication link and/or the received data stream. The reverse link message is then processed by a TX data processor 538, which also receives traffic data for a number of data streams from a data source 536, modulated by a modulator 580, conditioned by transmitters 554a through 554r, and transmitted back to transmitter system 510.

At transmitter system 510, the modulated signals from receiver system 550 are received by antennas 524, conditioned by receivers 522, demodulated by a demodulator 540, and processed by a RX data processor 542 to extract the reserve link message transmitted by the receiver system 550. Processor 530 then determines which pre-coding matrix to use for determining the beamforming weights then processes the extracted message.

Figure 6B:
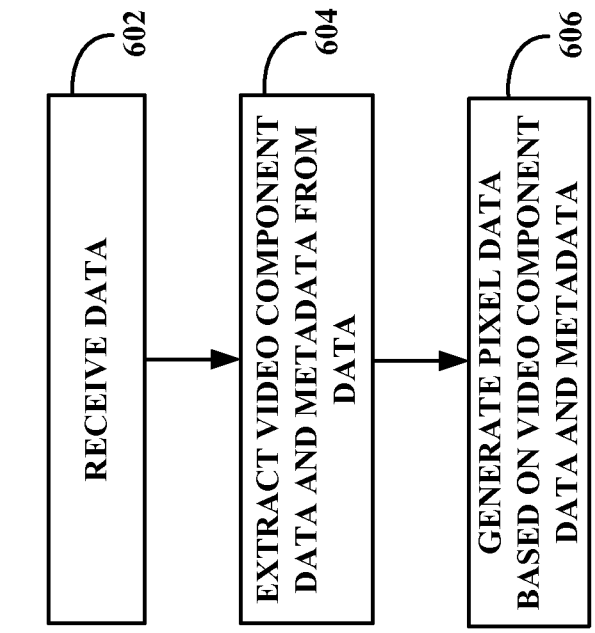
FIG. 6B is a flow chart of an example method of receiving video data in accordance with this disclosure.
Figure 6A:
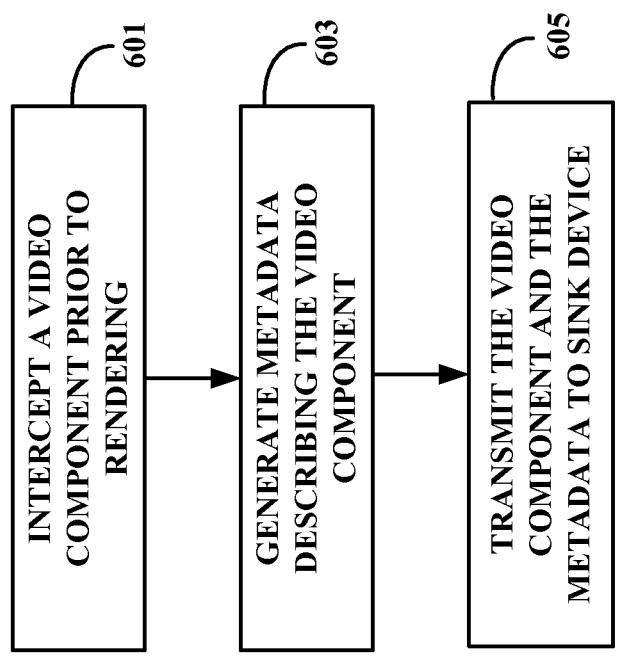
FIG. 6A is a flow chart of an example method of transmitting video data in accordance with this disclosure.

FIG. 6A is a flow chart showing an example method of transmitting video data in accordance with this disclosure.

The illustrated example method may be performed by a source device, such as source device 120 (FIG. 1A), source device 220 (FIG. 2A), or source device 320 (FIG. 3). In some examples, a computer-readable storage medium (e.g., memory 332) may store instructions, modules, or algorithms that, when executed, cause one or more processors (e.g., processor 331) to perform one or more of the illustrated steps in the flow chart. For purposes of example, the method will be described with reference to wireless source device 220 of FIG. 2A.

The method of FIG. 6A includes metadata encoder 274 intercepting a video component prior to rendering at source device 220 (601). Metadata encoder 274 can generate metadata describing the video component (603). Transport unit 233A can transmit the video component and the metadata to sink device 260.

FIG. 6B is a flow chart of an example method of receiving video data in accordance with this disclosure. The illustrated example method may be performed by a source device, such as source device 160 (FIG. 1A), source device 260 (FIG. 2B), or source device 460 (FIG. 4). In some examples, a computer-readable storage medium (e.g., memory 432) may store instructions, modules, or algorithms that, when executed, cause one or more processors (e.g., processor 431) to perform one or more of the illustrated steps in the flow chart. For purposes of example, the method will be described with reference to wireless source device 260 of FIG. 2B.

The method of FIG. 6B includes transport unit 234B receiving and decapsulating encapsulated data from wireless source device 220 (602). Metadata decoder 275 extracts from the decapsulated data video component data and metadata (604). Based on the metadata and the video component data, graphics composition module 277 generated pixel data for display (606). The pixel data may, for example, be a frame of video. The video component data may, for example, include a first type of video component data, a second type of video component data, and metadata. The metadata may identify a position of image data for the first video component relative to image data for the second video component. In one example, the first video component data may correspond to a compressed audio/video file, while the second video component data corresponds to pixel data for user interface controls that are to be overlaid on the video.

The techniques of this disclosure may be implemented in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. If implemented in hardware, any features described as modules, units or components may be implemented together in an integrated logic device or separately as discrete but interoperable logic devices. If implemented in software, the techniques may be realized at least in part by a computer-readable medium comprising instructions that, when executed in a processor, performs one or more of the methods described above. The computer-readable medium may comprise a tangible and non-transitory computer-readable storage medium and may form part of a computer program product, which may include packaging materials. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code may be executed by one or more processors, such as one or more digital signal processors (DSPs), general purpose microprocessors, an application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video codec. Also, the techniques could be fully implemented in one or more circuits or logic elements.

Various aspects of the disclosure have been described. These and other aspects are within the scope of the following claims.

The invention claimed is:

1. A method of transmitting video data from a wireless source device to a wireless sink device, the method comprising:
    exchanging capability information with the wireless sink device;
    based on the exchange of capability information with the wireless sink device, selecting an operating mode for the wireless source device, wherein the operating mode comprises one of a video component mode or a pixel domain mode;
    when the selected operating mode for the wireless source device comprises the video component mode, intercepting a first video component prior to the first video component being rendered at the wireless source device, wherein the first video component comprises a call to a driver of a graphics processing unit, and wherein the driver supports a graphics application program interface (API), and wherein the first video component further comprises one or more commands supported by the graphics API;
    generating first metadata describing the first video component, wherein the first metadata comprises an identifier of a screen location to which the first video component is to be rendered;
    intercepting a second video component prior to rendering at the wireless source device, wherein the second video component comprises pixel data;
    generating second metadata describing the second video component, wherein the second metadata comprises an identifier of a screen location to which the second video component is to be rendered;
    transmitting the first video component, the second video component, the first metadata, and the second metadata to the wireless sink device; and
    rendering at the wireless source device a frame of video based on the first video component and the second video component.

2. The method of claim 1,
wherein exchanging capability information with the wireless sink device comprises receiving from the wireless sink device an indication that the wireless sink device supports the graphics API.

3. The method of claim 1, further comprising intercepting a third video component prior to rendering at the wireless source device, wherein the third video component comprises compressed video data.

4. The method of claim 1, further comprising intercepting a third video component prior to rendering at the wireless source device, wherein the third video component comprises audio data.

5. The method of claim 1, wherein the first metadata comprises an identifier of a frame for which the first video component is associated.

6. The method of claim 1, wherein the first metadata comprises a resolution of the first video component.

7. The method of claim 3, wherein intercepting the third video component comprises detecting the initialization of a media parser.

8. A wireless source device comprising:
a memory;
one or more processors communicatively coupled to the memory, the one or more processors configured to:
exchange capability information with the wireless sink device;
based on the exchange of capability information with the wireless sink device, select an operating mode for the wireless source device, wherein the operating mode comprises one of a video component mode or a pixel domain mode;
when the selected operating mode for the wireless source device comprises the video component mode, intercept a first video component prior to the first video component being rendered at the wireless source device, wherein the first video component comprises a call to a driver of a graphics processing unit, and wherein the driver supports a graphics application program interface (API), and wherein the first video component further comprises one or more commands supported by the API;
generate first metadata describing the first video component, wherein the first metadata comprises an identifier of a screen location to which the first video component is to be rendered;
intercept a second video component prior to rendering at the wireless source device, wherein the second video component comprises pixel data;
generate second metadata describing the second video component, wherein the second metadata comprises an identifier of a screen location to which the second video component is to be rendered;
transmit the first video component and the first metadata to a wireless sink device;
transmit the second video component to the wireless sink device; and
render at the wireless source device a frame of video based on the first video component and the second video component.

9. The wireless source device of claim 8, wherein
to exchange the capability information with the wireless sink device, the one or more processors are configured to receive from the wireless sink device an indication that the wireless sink device supports the graphics API.

10. The wireless source device of claim 8, wherein the metadata encoder is further configured to intercept a third video component prior to rendering at the wireless source device, wherein the third video component comprises compressed video data.

11. The wireless source device of claim 8, wherein the metadata encoder is further configured to intercept a third video component prior to rendering at the wireless source device, wherein the third video component comprises audio data.

12. The wireless source device of claim 8, wherein the first metadata comprises an identifier of a screen location to which the first video component is to be rendered.

13. The wireless source device of claim 8, wherein the first metadata comprises a resolution of the first video component.

14. The wireless source device of claim 8, wherein intercepting the first video component comprises identifying a call to a graphics application program interface.

15. The wireless source device of claim 8, wherein intercepting the first video component comprises detecting the initialization of a media parser.

16. A non-transitory, computer-readable storage medium storing instructions that upon execution by one or more processors cause the one or more processors to:
exchange capability information with the wireless sink device;
based on the exchange of capability information with the wireless sink device, select an operating mode for the wireless source device, wherein the operating mode comprises one of a video component mode or a pixel domain mode;
when the selected operating mode for the wireless source device comprises the video component mode, intercept a first video component prior to the first video component being rendered at the wireless source device, wherein the first video component comprises a call to a driver of a graphics processing unit, and wherein the driver supports a graphics application program interface (API), and wherein the first video component further comprises one or more commands supported by the API;
generate first metadata describing the first video component, wherein the first metadata comprises an identifier of a screen location to which the first video component is to be rendered;
intercept a second video component prior to rendering at the wireless source device, wherein the second video component comprises pixel data;
generate second metadata describing the second video component, wherein the second metadata comprises an identifier of a screen location to which the second video component is to be rendered;
transmit the first video component, the second video component, the first metadata, and the second metadata to the wireless sink device; and
render at the wireless source device a frame of video based on the first video component and the second video component.

17. A wireless source device configured to transmit video data to a wireless sink device, the wireless source device comprising:
means for exchanging capability information with the wireless sink device;
means for selecting an operating mode for the wireless source device based on the exchange of capability information with the wireless sink device, wherein the operating mode comprises one of a video component mode or a pixel domain mode;

means for intercepting a first video component prior to the first video component being rendered at the wireless source device when the selected operating mode for the wireless source device comprises the video component mode, wherein the first video component comprises a call to a driver of a graphics processing unit, and wherein the driver supports a graphics application program interface (API), and wherein the first video component further comprises one or more commands supported by the API;

means for generating first metadata describing the first video component, wherein the first metadata comprises an identifier of a screen location to which the first video component is to be rendered;

means for intercepting a second video component prior to rendering at the wireless source device, wherein the second video component comprises pixel data;

means for generating second metadata describing the second video component, wherein the second metadata comprises an identifier of a screen location to which the second video component is to be rendered;

means for transmitting the first video component, the second video component, the first metadata, and the second metadata to the wireless sink device; and means for rendering at the wireless source device a frame of video based on the first video component and the second video component.

* * * * *